United States Patent
Dubois et al.

(10) Patent No.: US 7,550,543 B2
(45) Date of Patent: Jun. 23, 2009

(54) POLYMER-BASED COMPOSITES COMPRISING CARBON NANOTUBES AS A FILLER, METHOD FOR PRODUCING SAID COMPOSITES, AND ASSOCIATED USES

(75) Inventors: Philippe Dubois, Braives (BE); Michael Alexandre, Ougree (BE); Daniel Bonduel, Mons (BE); Michael Mainil, Trivieres (BE)

(73) Assignee: S.A. Nanocyl, Samberville (BE)

( * ) Notice: Subject to any disclaimer, the term of this patent is extended or adjusted under 35 U.S.C. 154(b) by 56 days.

(21) Appl. No.: 10/567,197

(22) PCT Filed: Aug. 5, 2004

(86) PCT No.: PCT/BE2004/000113
§ 371 (c)(1), (2), (4) Date: Sep. 21, 2006

(87) PCT Pub. No.: WO2005/012170
PCT Pub. Date: Feb. 10, 2005

(65) Prior Publication Data
US 2007/0184969 A1    Aug. 9, 2007

Related U.S. Application Data

(60) Provisional application No. 60/492,613, filed on Aug. 5, 2003.

(30) Foreign Application Priority Data
Feb. 4, 2004    (EP)    .................................. 04447025

(51) Int. Cl.
C08F 4/608    (2006.01)
C08F 4/602    (2006.01)
C08F 4/6192    (2006.01)
B01J 31/22    (2006.01)

(52) U.S. Cl. ........................ 526/160; 526/161; 526/165; 526/169.1; 502/103; 502/152; 502/155

(58) Field of Classification Search ................ 526/160, 526/161, 165, 169.1; 502/103, 152, 155
See application file for complete search history.

(56) References Cited

U.S. PATENT DOCUMENTS 6,099,965 A * 8/2000 Tennent et al. ............... 428/408
6,713,519 B2 * 3/2004 Wang et al. .................. 518/715
7,151,146 B1 * 12/2006 Kwag et al. .................. 526/152
2003/0119920 A1    6/2003 Wang et al.

FOREIGN PATENT DOCUMENTS

EP    10267317    3/2000
WO    WO 02/076888 A1    10/2002

OTHER PUBLICATIONS

Alexandre, M. et al. (2000) "Use of metallocenes in the polymerization-filling technique with production of polyolefin-based composites" Macromol. Rapid Commun. 21:931-936.

(Continued)

Primary Examiner—Caixia Lu
(74) Attorney, Agent, or Firm—Knobbe, Martens, Olson & Bear LLP

(57) ABSTRACT

The invention relates to a method for producing carbon nanotubes in a dispersed state. The method comprises a stage whereby polymerization is carried out from at least one so-called monomer of interest, in the presence of a catalytic system. The catalytic system comprises a cocatalyst/catalyst catalytic couple that is supported by a catalyst carrier, which corresponds to said carbon nanotubes. The invention also relates to composite materials obtained by said method, and to a catalytic system for implementing said method. The invention further relates to the use of the inventive method and products in the field of polymers, especially that of nanotechnologies.

38 Claims, 19 Drawing Sheets

OTHER PUBLICATIONS

Ajayan, P.M. 1999 "Nanotubes from carbon" *Chemical Reviews* 99: 1787-1799.

Demczyk, B.G., et al. 2002 "Direct mechanical measurement of the tensile strength and elastic modulus of multiwalled carbon nanotubes" *Materials Science and Engineering* A334: 173-178; Elsevier.

Lau, K. 2002 "The revolutionary creation of new advanced materials-carbon nanotube composites" *Composites: Part B* 33: 263-277; Elsevier.

Thostenson, E. 2001 "Advances in the science and technology of carbon nanotubes and their composites: a review" *Composites Science and Technology* 61: 1899-1912; Elsevier.

* cited by examiner

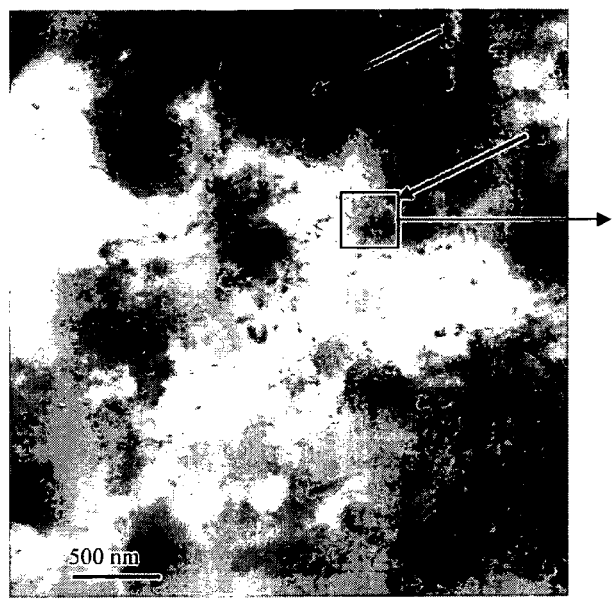
Fig. 9a                    Fig. 9b

POLYMER-BASED COMPOSITES COMPRISING CARBON NANOTUBES AS A FILLER, METHOD FOR PRODUCING SAID COMPOSITES, AND ASSOCIATED USES

RELATED APPLICATIONS

This application is a U.S. National Phase of International Patent application No.: PCT/BE2004/0000113, filed Aug. 5, 2004, designating the US and published not in English on Feb. 10, 2005 as WO 2005/012170, which claims the benefit of European Patent application No.: 04447025.0, filed Feb. 4, 2004; and U.S. Provisional Patent application No. 60/492,613, filed Aug. 5, 2003, the disclosure of which is hereby expressly incorporated by reference in its entirety.

FIELD OF THE INVENTION

The present invention relates to the field of materials and more particularly to the field of the composite materials defined below as microcomposites and nanocomposites.

The present invention relates especially to a process for obtaining a composite material comprising a matrix of at least one polymer in which are dispersed carbon nanotubes serving as filler. The present invention also relates to said composites thus obtained and to uses thereof in the field of nanotechnology.

PRIOR ART

Polymer materials were developed at the start of the 20th-century and they currently occupy an increasingly important place in our daily life.

For that very reason, industrial pressure is currently such that it demands increasing specialization of applications, and it is thus necessary to propose more and more efficient materials to satisfy this need.

In the case of polymer materials, this demand implies the provision of solutions to overcome the inherent weaknesses of these materials, which are especially their relative lack of mechanical strength and their flammable nature.

It has thus been proposed to combine these polymer materials with other components known as "fillers" in order to produce materials known as "composite materials with a polymer matrix" whose properties are reinforced compared with the polymer matrix alone: greater rigidity, better fire resistance, etc.

These fillers may be of fibrillar type such as glass, carbon or Kevlar fibres. These fillers may also be of particulate type such as carbon blacks, silicas, aluminas, calcium carbonates, clays or glass beads.

By way of example, it has been proposed to make copolyolefin-based composites by polymerization of said olefins on fillers in the presence of a cocatalyst/catalyst couple according to the "Polymerization-Filling Technique" or "PFT" (Alexandre M. et al. *Macromol. Rapid. Comm.* (2000), vol. 21, No. 13, pp. 931-936). The catalyst tested was a metallocene, more specifically tert-butylamidodimethyl(tetramethyl-n5-cyclopenta-dienyl)silanedimethyltitanium (CGC) and the cocatalyst was methylaluminoxane (MAO). Various fillers were tested, including kaolin and graphite. These fillers were of very different nature in terms of composition (inorganic, organic or metallic) and in terms of morphology and surface properties (acidic or basic), but they all had in common a specific surface area that was compatible with the amount of catalyst used, which was relatively small, so as to allow a sufficiently homogeneous deposition of the catalyst at the surface of these fillers and thus to obtain good polymerization results.

Among the composites with a polymer matrix and with particulate fillers, which may be distinguished according to the size of the particles, are microcomposites, in which the size of the filler is greater than or equal to one micrometre, and nanocomposites, for which one of the three dimensions of the filler is of the order of one to a few tens of nanometres.

Nanocomposites have given rise very recently to considerable research development. The reason for this is that they are characterized by noteworthy properties for relatively low filler contents: they result in a substantial improvement in the mechanical properties of the polymer matrix such as the rigidity, and develop a flame-retardant power that makes them very advantageous. Furthermore, contrary to fillers of fibrillar type, they strengthen the polymer matrix in all directions of space [1,2].

More particularly, nanocomposites comprising carbon nanotubes as particulate filler have already been proposed for various applications (Ajayan, P.M. 1999 *Chem Rev* 99:1787-1799; Demczyk, B. G. et al. 2002 *Materials Sci and Eng* A334:173-178; Lau, K.-T. and Hui, D. 2002 *Composites:* Part B 33:263-277; and Thostenson, E. T. et al. 2001 *Composites Science and Technology* 61:1899-1912). Carbon nanotubes are in fact one of the allotropic forms of carbon, which may be seen as one or more leaflets of graphite rolled into a cylinder and sealed at the ends. These carbon nanotubes are, inter alia, characterized by good mechanical properties since their tensile strength is 40 times greater than that of carbon fibres, and also good electrical properties, to the point that they have been proposed for the manufacture of semiconductors or metallic conductors, depending on the structure of the nanotube.

However, in practice, the use of nanotubes as fillers in the polymer matrices for the manufacture of nanocomposites does not appear for the time being to be able to meet the industrial expectations. Specifically, it turns out that the advantageous properties of carbon nanotubes are not always transferred to the nanocomposite.

These data are explained by the natural aptitude of carbon nanotubes to aggregate together in very stable packets or "bundles".

A person skilled in the art is thus confronted with this problem of aggregation of nanotubes, which limits their use in nanocomposites, and at the present time those skilled in the art are unfortunately still awaiting an effective solution to overcome this problem.

It will be noted that the use of carbon nanotubes in catalytic systems is known per se, as attested by documents US-A1-2003/0 119 920 and Patent Abstracts of Japan vol. 2000, No. 6 (20 Sep. 2000).

The first of these documents describes a catalytic system comprising a support covered with a layer of carbon nanotubes and a catalyst composition capable of catalysing a chemical reaction. This catalytic system may be used in many chemical reactions and especially in polymerizations. However, the carbon nanotubes are not presented in said document as forming an integral part of the catalytic support itself.

The second of these documents describes a process for depositing carbon nanotubes onto catalytic molybdenum on an inorganic support. In said document, the catalytic system thus comprises (i) carbon nanotubes, (ii) a catalyst that is molybdenum, and (iii) an inorganic support that may be likened to a cocatalyst, the carbon nanotubes constituting the product of the reaction catalysed by said catalyst.

AIMS OF THE INVENTION

The present invention aims to provide a solution that does not have the drawbacks of the prior art as described above.

In particular, the present invention aims to provide a process for obtaining carbon nanotubes in dispersed form in a polymer matrix, which may be used as filler in polymer-based composites and especially nanocomposites.

The present invention also aims to provide composites, and especially nanocomposites, comprising a matrix of at least one polymer and at least carbon nanotubes acting as fillers, wherein the dispersion of the carbon nanotubes is such that the composite, and especially the nanocomposite, advantageously combines the industrially advantageous physical and chemical properties of said polymer and of said carbon nanotubes.

Another aim of the invention is to provide a process for dispersing carbon nanotubes in a polymer matrix, the implementation of which is relatively simple and reasonable in terms of cost compared with the processes proposed in the prior art.

SUMMARY OF THE INVENTION

The present invention relates to a process for obtaining carbon nanotubes in dispersed form, characterized in that it comprises a step of polymerization from at least one monomer, referred to as "monomer of interest", and in the presence of a catalytic system, said catalytic system comprising a cocatalyst/catalyst catalytic couple that is supported on a catalysis support, said catalysis support corresponding to said carbon nanotubes.

More specifically, the present invention relates to a process for obtaining a composite material comprising at least one polymer matrix in which carbon nanotubes serving as filler are homogeneously dispersed, said process being characterized in that, starting with said carbon nanotubes and a monomer, said carbon nanotubes are used as catalysis support to bind homogeneously onto the surface thereof a cocatalyst/catalyst couple and thus to form a catalytic system, said catalytic system is rendered active for polymerization, and polymerization of said monomer at the surface of the carbon nanotubes is performed using said active catalytic system, the polymerization being allowed to progress over time so as thus gradually to obtain, as the polymerization of the monomer proceeds, the polymer matrix around the carbon nanotubes, and the composite formed is then recovered.

It is meant by "dispersion of nanotubes in the polymer matrix" means a dispersion of nanotubes in said matrix such that the surface area of contact between two carbon nanotubes is less than 20% of the total surface area of said nanotubes, preferably less than 10%, preferably less than 5%, less than 2% and preferably less than 1% of the total surface area of said nanotubes.

The term "homogeneous" means a distribution of the carbon nanotubes in the polymer matrix that is homogeneous at least at the microscopic scale, and preferably at the nanoscopic scale.

Preferably, the process according to the invention comprises the following steps:
  preparing a suspension of carbon nanotubes in an inert solvent is prepared;
  pretreating said carbon nanotubes by adding said cocatalyst, so as to obtain a suspension of pretreated carbon nanotubes in which the cocatalyst is adsorbed onto the surface of the carbon nanotubes;
  preparing a reaction mixture from the suspension of carbon nanotubes thus pretreated, by adding a catalyst and circulating a flow of monomer in said suspension of pretreated nanotubes so as to bring about in said reaction mixture the polymerization of said monomer at the surface of said nanotubes and thus to form a composite material comprising said polymer of interest and said carbon nanotubes, in which said carbon nanotubes are coated with said polymer of interest;
  stopping the polymerization reaction when the polymerization in the reaction mixture has reached the desired rate of polymerization, of between about 0.1% and about 99.9%, and said composite material thus synthesized is recovered.

Preferably, the monomer of interest is an olefin and the polymer of interest is a polyolefin.

Said polyolefin may especially be a hydrophobic polyolefin.

Preferably, said monomer of interest is selected from the group consisting of ethylene, propylene, copolymers thereof with alpha-olefins, conjugated alpha-diolefins, styrene, cycloalkenes, norbornene, norbornadiene and cyclopentadiene, and mixtures thereof.

Examples of alpha-olefins include 1-hexene and 1-octene.

Preferably, the polymer of interest is selected from the group consisting of ethylene-based polyolefins and propylene-based polyolefins and mixtures thereof.

Advantageously, the polymer of interest is polyethylene.

Advantageously, in the process of the invention, the cocatalyst/catalyst couple and the experimental parameters are chosen so as to be able to immobilize the catalyst at the surface of the carbon nanotubes by means of the cocatalyst and thus to form the catalytic system.

Thus, preferably, the catalyst is chosen such that it is capable of catalysing the polymerization of the monomer of interest, said catalyst being selected from the group consisting of metallocenes, hindered amidoaryl chelates, hindered oxoaryl chelates, Fe (II and III) and Co (II) bis(imino)pyridines, and Brookhart complexes based on Ni (II) and Pd (II), and mixtures thereof.

In general, all these catalysts have in common the fact that they are soluble complexes of group IV of the chemical elements (Ti, Zr, Hf) that are active in polymerization.

It will be noted that the metallocenes may be bridged or non-bridged.

Advantageously also, the cocatalyst is methylaluminoxane or a chemically modified methylaluminoxane or a mixture thereof.

It is meant by "chemically modified methylaluminoxane" a methylaluminoxane in which about one third of the alkyls are in the form of isobutyls, the rest of said alkyls being in the form of methyls.

In a particularly advantageous manner, the cocatalyst/catalyst catalytic couple is the methylaluminoxane/$Cp^*_2ZrCl_2$ couple.

Preferably, the amount of catalyst in the process of the invention is between about $10^{-6}$ and about $10^{-5}$ mol/g of carbon nanotubes.

Preferably, the amount of cocatalyst in the reaction mixture is between about $10^{-3}$ and about $10^{-2}$ mol/g of carbon nanotubes.

Advantageously, the temperature of the reaction mixture is between 25° and 140° C.

Preferably, according to the invention, the pretreatment is performed at a temperature of between 25° C. and 200° C. for a time period of between 1 minute and 2 hours.

Advantageously, the polymerization is performed at a pressure of between about 1 and about 3 bars of monomer and preferably between 1.1 and 2.7 bars of monomer.

Preferably, in order to prepare the reaction mixture, the catalyst is added to the suspension of pretreated carbon nanotubes before circulating the flow of monomer in said suspension.

Alternatively, in order to prepare the reaction mixture, the addition of the catalyst to the suspension of pretreated carbon nanotubes and the circulation of the flow of monomer in said suspension are concomitant.

Preferably, the carbon nanotubes are selected from the group consisting of single-walled carbon nanotubes, double-walled carbon nanotubes and multi-walled carbon nanotubes, and mixtures thereof.

Preferably, the carbon nanotubes are crude and/or purified carbon nanotubes.

In the process of the invention, the carbon nanotubes may be functionalized carbon nanotubes.

Preferably, the polymerization reaction is stopped when the rate of polymerization is such that the composite comprises between about 50% and about 99.9% of carbon nanotubes and between about 50% and 0.1% of polymer.

In the latter case, the process according to the invention preferably includes an additional step during which the composite material, once recovered, is used as a masterbatch to prepare a nanocomposite based on a polymer referred to as an addition polymer, said addition polymer being miscible and compatible with the polymer of interest of the composite material.

Alternatively, the polymerization reaction is stopped when the rate of polymerization is sufficient to obtain in sufficient amount a composite material corresponding to a nanocomposite and comprising a matrix of said polymer of interest in which the carbon nanotubes are homogeneously dispersed at the nanoscopic scale.

More specifically, the polymerization reaction is preferably stopped when the nanocomposite formed comprises between about 0.1% and about 50% of carbon nanotubes and between about 99.9% and about 50% of polymer.

The present invention also relates to a catalytic system for performing the process described above and comprising at least carbon nanotubes, a cocatalyst and a catalyst, said catalyst forming with said cocatalyst a catalytic couple, in which said catalyst and said cocatalyst are bound to the surface of said carbon nanotubes.

The present invention also relates to a composition for performing this process and comprising said catalytic system.

The present invention also relates to a composite material obtained by the process described above.

This composite material comprises between about 0.1% and 99.9% of carbon nanotubes and between about 99.9% and 0.1% of polymer.

According to a first preferred embodiment of the invention, the composite material corresponds to a nanocomposite and comprises at least one matrix of at least one polymer of interest in which carbon nanotubes are homogeneously dispersed at the nanoscopic scale in the form of fillers.

Preferably, this composite material comprises between about 0.1% and about 50% of carbon nanotubes and between about 99.9% and about 50% of polymer.

Preferably, in the composite material according to the invention, the carbon nanotubes are covered or coated with the polymer.

The invention also relates to a composite material comprising a matrix of at least one addition-polymer and the composite material as described above.

Another subject of the invention is the use of the process, and/or of the catalytic system, and/or of the composition, and/or of the composite material described above in applications in the field of nanotechnology.

The present invention also relates to a process for polymerizing a monomer referred to as a monomer of interest, characterized in that it uses the process according to the invention, the polymerization reaction being allowed to proceed for long enough to have a proportion of carbon nanotubes of less than 0.1% and a proportion of polymer of greater than 99.9%.

The invention also relates to a polymer obtained by this process.

Definitions

Reference will be made to the preceding paragraphs to understand what is meant in the present invention by the terms "nanocomposites". "microcomposites" "aggregation/deaggregation", "dispersion", "polymer matrix" and "filler".

It will be noted that the polymer matrix comprises at least one polymer.

The term "composite materials" relates to both microcomposites and nanocomposites.

To understand specifically what is meant by the term "composite material" or "composite" in the present invention, reference may be made to the document "Materiaux et composites [Materials and composites]" from Berthelot J. M., published by Tec & Doc, 3rd edition, Paris 1999, p. 3.

The term "catalyst" has in the present invention the same meaning as that used by a person skilled in the art in the field of chemistry. This term denotes a compound which, when used at very low concentration in a reaction medium, allows the rate of a polymerization reaction to be increased via interaction with the reagents, without, however, being chemically altered at the end of the reaction.

The term "cocatalyst" has in the present invention the same meaning as that used by a person skilled in the art in the field of chemistry. This term denotes a compound capable of acting synergistically with the catalyst to increase the rate of the polymerization reaction.

The term "poison" means a compound that inhibits a polymerization reaction.

The carbon nanotubes are referred to as being "single-walled", "double-walled" or "multi-walled" depending on whether the nanotubes consist, respectively, of one, two or several leaflets as described above. This terminology is well known to those skilled in the art.

BRIEF DESCRIPTION OF THE FIGURES

FIG. 9a is a TEM microphotograph of the same sample Dabo40b and FIG. 9b corresponds to a zoom on the zone containing a bundle of MWNT carbon nanotubes.

Figure 12:
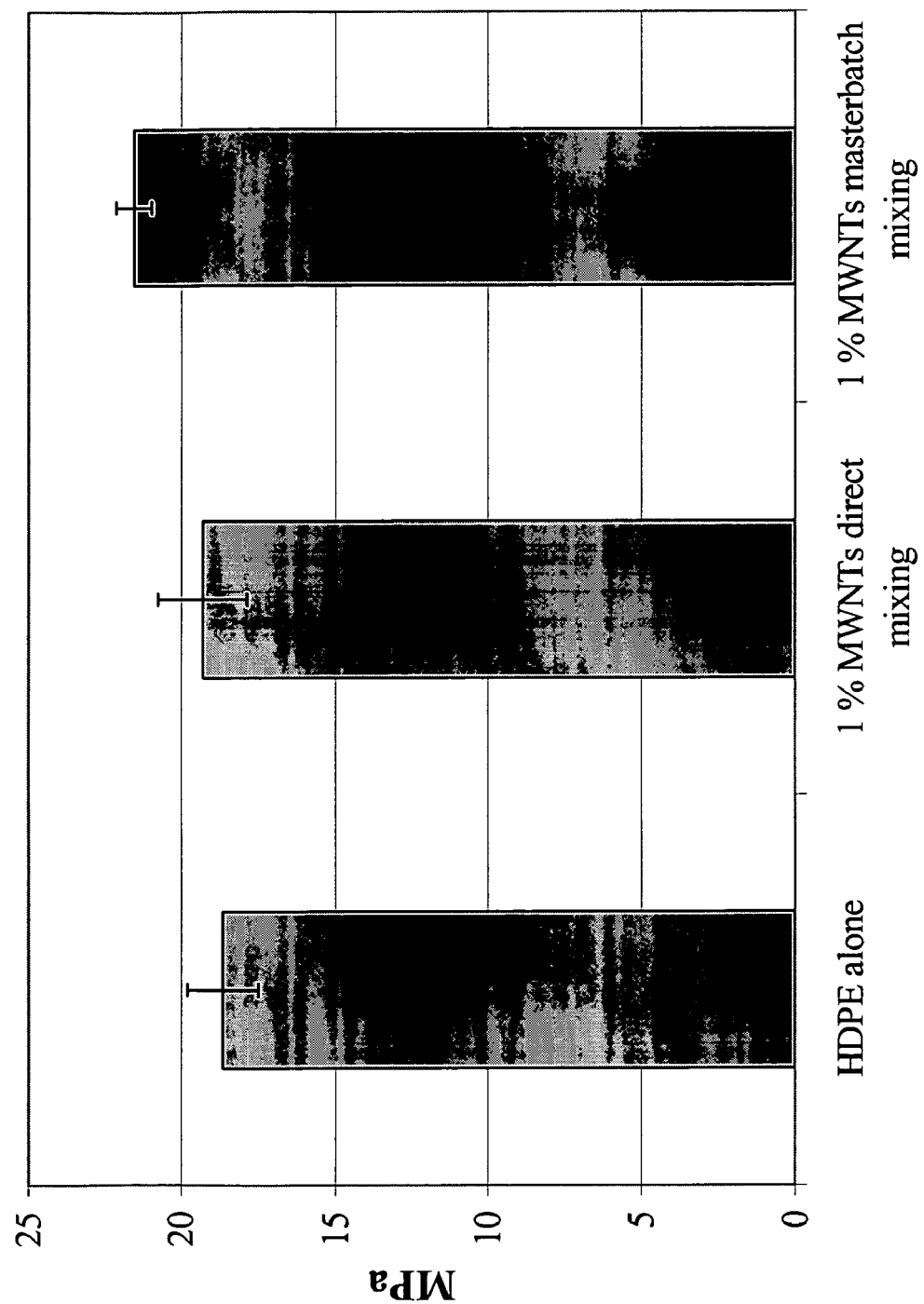
FIGS. 12 to 16 compare the results of tensile tests obtained for three types of sample: high-density polyethylene alone; a composite obtained by simple mixing of high-density polyethylene with 1% of multi-walled carbon nanotubes (MWNTs); a composite obtained from high-density polyethylene and a masterbatch prepared according to the invention.
Figure 13:
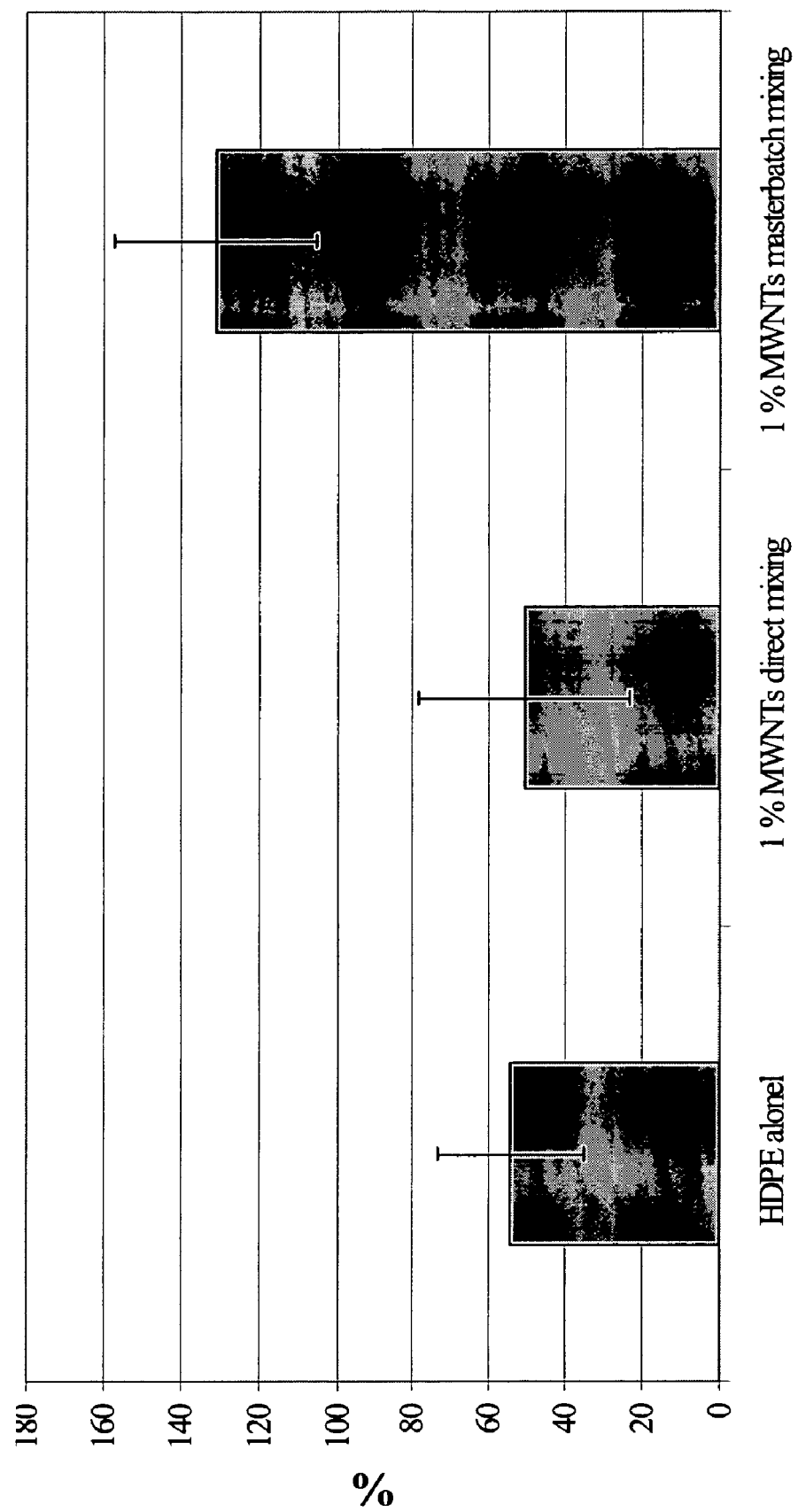
Figure 14:
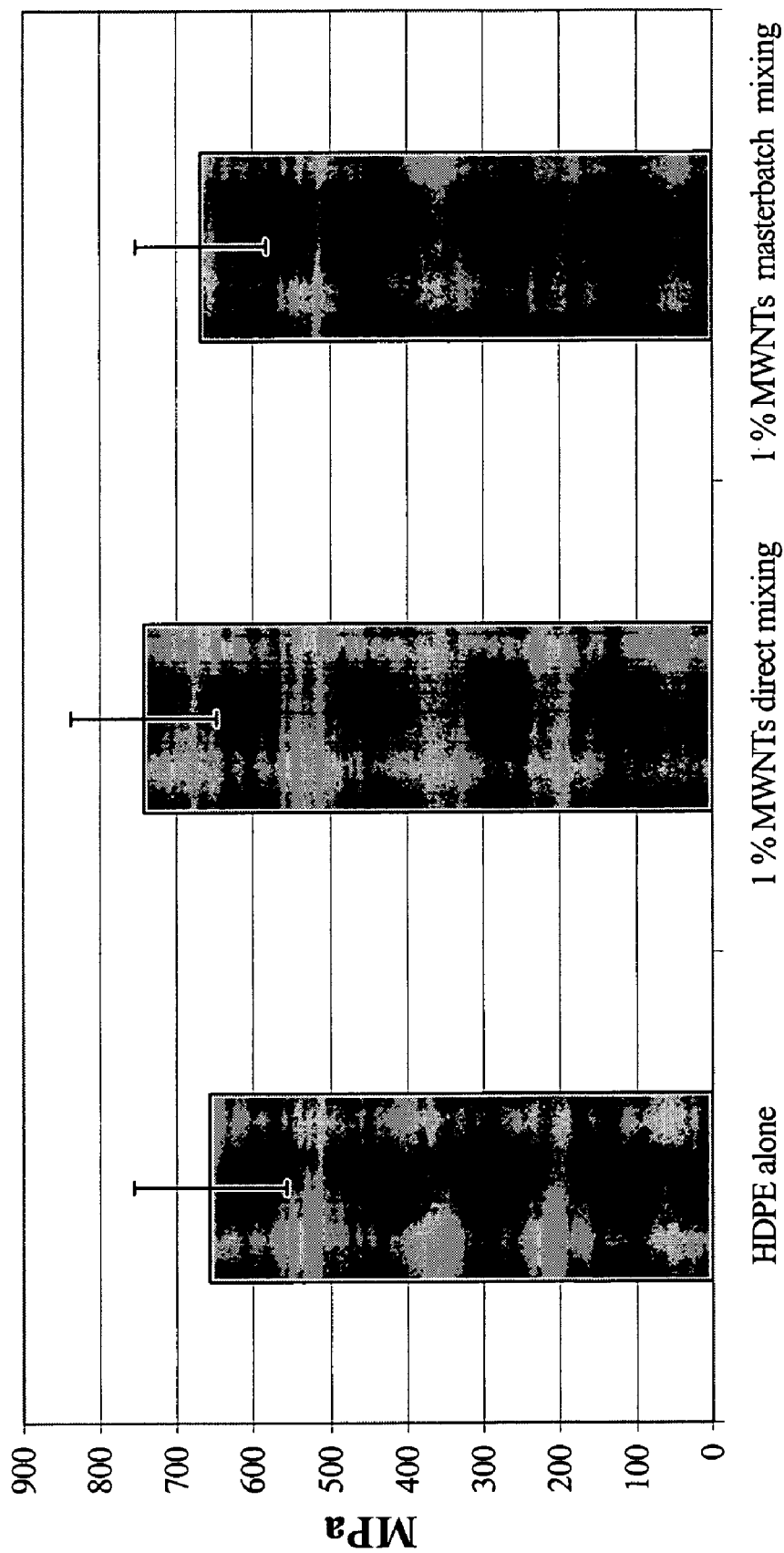
Figure 15:
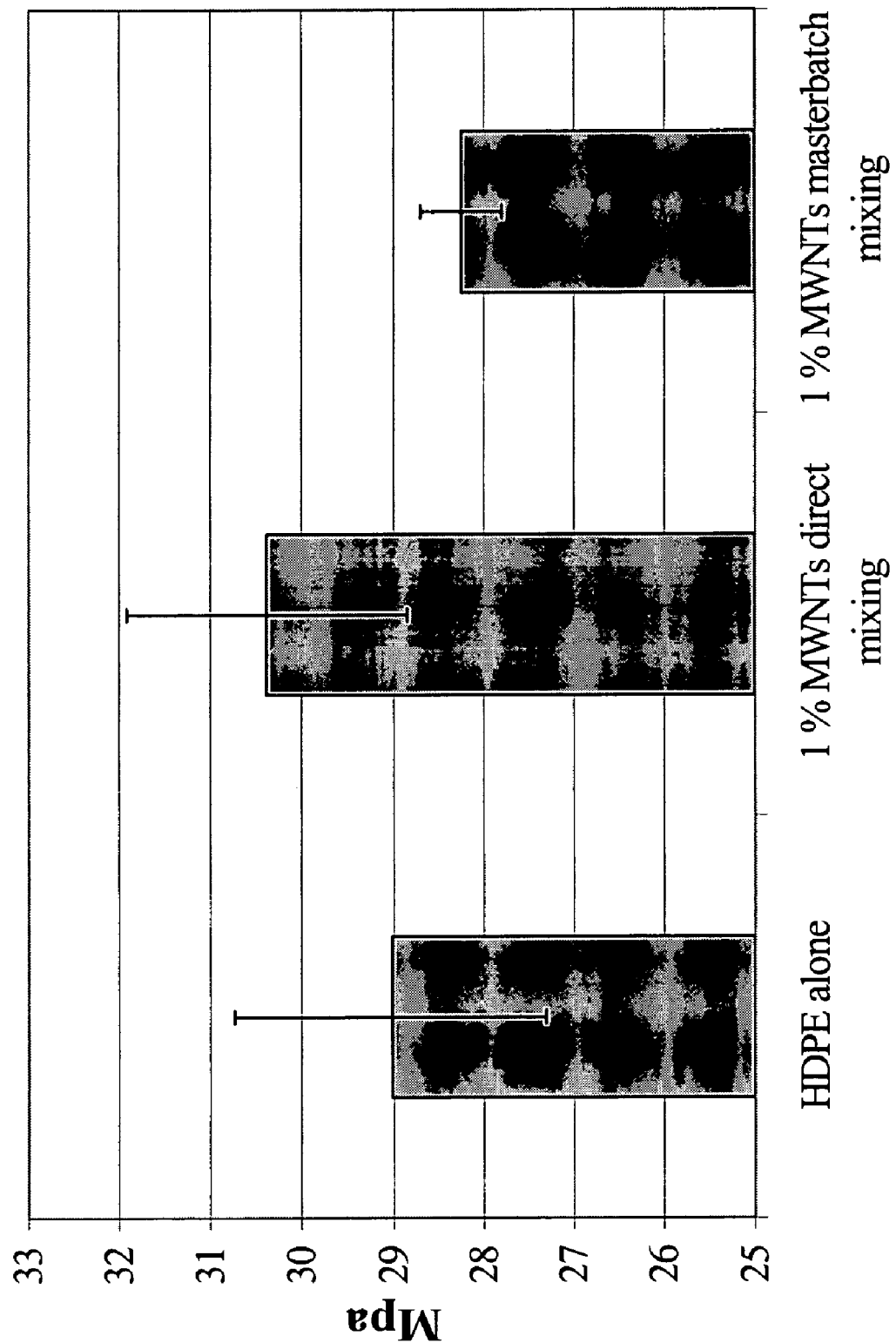

More specifically, FIGS. 12 to 16 compare the following parameters:

FIG. 12: breaking stress
FIG. 13: elongation at break
FIG. 14: Young's modulus
FIG. 15: yield-point stress
FIG. 16: elongation at the yield point

DETAILED DESCRIPTION OF THE INVENTION

The novelty of the present invention resides in the idea of proceeding, to prepare polyethylene/carbon nanotube nanocomposites, via a step of polymerization on a treated filler, according to the technique known as the "Polymerization-Filling Technique" and abbreviated to "PFT" [8].

During this polymerization step, a catalyst known for catalysing the polymerization of the monomer of interest is bound to the surface of the filler, i.e. in this case pretreated carbon nanotubes advantageously in suspension form. The polymerization of the monomer under consideration is then initiated directly on the surface of this same filler.

The pressure at the surface of the nanotubes, brought about by the polymerization during this step, allows, in an entirely unexpected manner, according to the invention, the deaggregation of the bundles that are usually associated with the formation of nanocomposites comprising carbon nanotubes. A dispersion of carbon nanotubes in the form of filler in the polymer matrix is thus obtained in the nanocomposite, and this dispersion is homogeneous at the nanoscopic scale.

It will be noted that the pretreatment of the carbon nanotubes consists in binding to the surface of the carbon nanotubes a cocatalyst selected on the basis of being catalytically active in cooperation with the catalyst during the polymerization of the monomer. In other words, this means that the cocatalyst and the catalyst are chosen to form together a catalytic couple for the polymerization of the monomer and that the carbon nanotubes may be viewed as being a catalysis support that defines with said catalytic couple a catalytic system.

It should be understood that, according to the present invention, the binding of the catalyst to the surface of the carbon nanotubes is performed via the cocatalyst, such that the catalyst and the cocatalyst are chemisorbed onto the surface of the nanotubes.

The present invention is illustrated by means of the particular example of ethylene and of the preparation of nanocomposites based on a polyethylene matrix.

However, the invention also relates to other polymers and other nanocomposites that a person skilled in the art may easily identify on the basis of the present description, as underlined above.

This is likewise the case for the nature of the catalyst and that of the cocatalyst.

It will be noted, however, that a necessary condition for performing the process according to the invention is that the polymer of interest formed is insoluble in the polymerization medium (reaction mixture) such that it can precipitate at the very site of its polymerization, i.e. on the surface of the nanotubes.

Figure 1A:
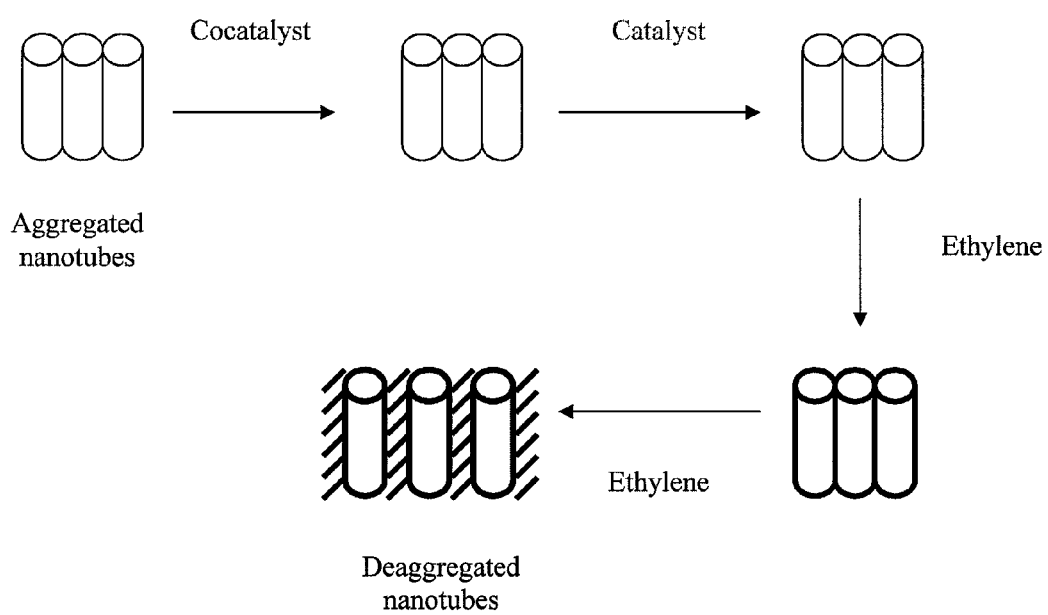
FIG. 1a schematically shows the principle of the process according to the present invention applied to the case of polyethylene.

FIG. 1a summarizes the principle of the process according to the present invention applied to the case of polyethylene. As shown in this figure, ethylene is polymerized directly at the surface of the nanotubes in suspension, which leads to gradual coating or covering of the carbon nanotubes with polyethylene as it is synthesized. The effect of this coating is to force the carbon nanotubes to become separated from each other and thus to bring about deaggregation of the bundles of nanotubes.

The cocatalyst used by way of example and with which the carbon nanotubes are pretreated is methylaluminoxane, abbreviated to MAO. This cocatalyst is used in the form of a solution.

The cocatalyst is such that it is capable of interacting via interactions of Lewis acid-base type with the wall of the carbon nanotubes, which is rich in $\pi$ electrons.

The catalyst used by way of example, bis(1,2,3,4,5-pentamethylcyclopentadienyl)zirconium (IV) dichloride or $Cp^*_2ZrCl_2$, is then added. It is also in the form of a solution.

Figure 1B:
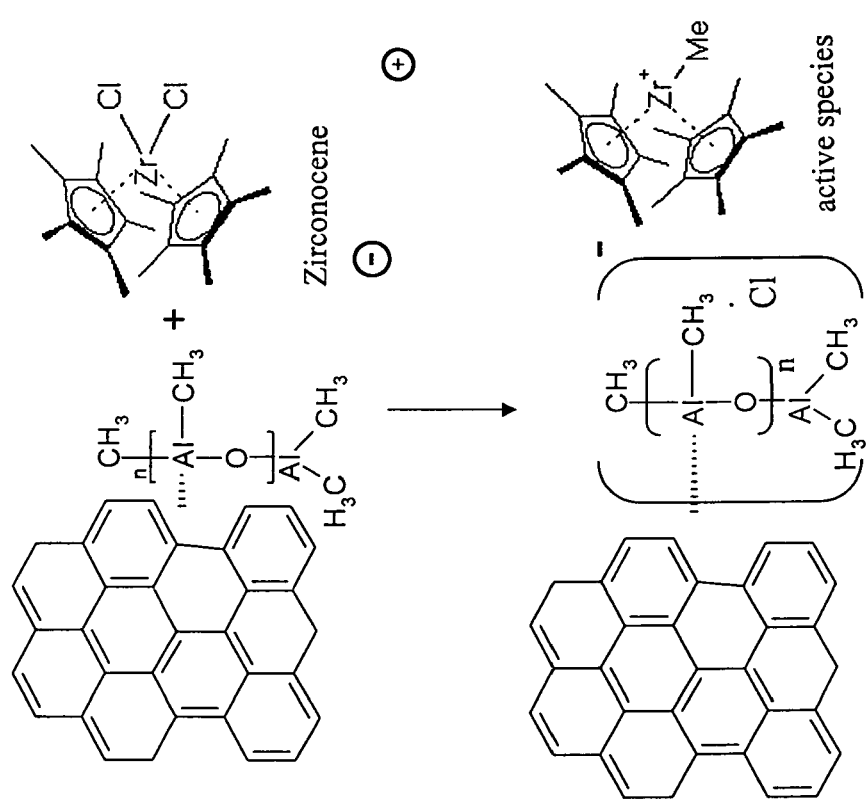
FIG. 1b shows the activation of the zirconocene catalyst at the surface of the nanotubes according to the process of the invention.

It will be noted that, on contact with the MAO-treated filler, $CP^*_2ZrCl_2$ gives rise to a cationic species that is active in the polymerization of ethylene and to a negative counterion located on the treated filler, as illustrated by FIG. 1b.

By means of this binding of the active species, the ethylene polymerizes at the surface of the filler. Since polyethylene is insoluble in the solvents used, it becomes deposited by precipitation directly onto the surface of the filler (i.e. the carbon nanotubes).

Reagents Used:

The fillers used were multi-walled carbon nanotubes (MWNTs). Two types of nanotube were used, namely crude MWNTs still containing 30% by weight of catalytic impurities (mainly about 30% by weight of alumina, 0.3% by weight of cobalt and 0.3% by weight of iron) and purified MWNTs containing traces of catalytic impurities (0.2% by weight of alumina, 0.3% by weight of iron and 0.3% by weight of cobalt). These nanotubes were provided by the department of Professor J. B. Nagy of the Facultés Universitaires Notre Dame de la paix, Namur.

The solvent used was n-heptane (analytical grade, from the company Acros). It was dried over molecular sieves of porosity equal to 0.4 nanometre (also supplied by the company Acros).

Certain solutions were prepared using dry toluene. To do this, the toluene (analytical grade) supplied by the company Labscan was dried by boiling it over calcium hydride, and was then freshly distilled.

The selected cocatalyst was methylaluminoxane (MAO) from the company Atofina. Solutions at between 3M and 0.2M of MAO in toluene were used for the syntheses.

Bis(1,2,3,4,5-pentamethylcyclopentadienyl)zirconium (IV) dichloride ($CP*_2ZrCl_2$) (from the company Aldrich) was used herein as catalyst. It was dissolved in dry toluene so as to form solutions of between 1 and 10 mM.

The ethylene (99.998%) (from the company Air Liquide) was used as supplied, in gas form.

Methanol (technical grade) (from the company Brenntag) was used to precipitate and to recover the polymer or the composite.

Pretreatment of the Carbon Nanotubes with the Cocatalyst:

The crude nanotubes (between 0.25 g and 1 g) were introduced into a 250 ml or 500 ml two-necked round-bottomed flask (according to the subsequent use) containing a magnetic stirring bar and equipped with a glass three-way tap (stoppered with a rubber septum).

The flask, connected to a vacuum trap immersed in liquid nitrogen in order to recover the adsorbed water, was conditioned, i.e. flame-dried under vacuum using a. Bunsen burner. The nanotubes were then dried overnight at between 100 and 150° C. under vacuum and with magnetic stirring. The flask was placed under a slight positive pressure of nitrogen.

100 ml of n-heptane were then introduced into the flask. An amount of MAO (between 0.001 and 0.01 mol/g of MWNTs) was freed beforehand of its trimethylaluminium by evaporation to dryness under vacuum. The evaporated trimethylaluminium was condensed in a vacuum trap immersed in liquid nitrogen and stored for analysis. This removal of the trimethylaluminium (TMA) is necessary since it has been demonstrated that TMA, which is an excellent Lewis acid, is an effective competitor of MAO as regards the adsorption [7].

The solid MAO was redissolved in toluene and transferred by capillary, under nitrogen, onto the suspension of MWNTs in heptane.

The system was thermostatically maintained at between 20 and 60° C. using an oil bath with magnetic stirring for between 10 minutes and 2 hours.

The MAO was concentrated to dryness under vacuum in the presence of the MWNTs, and the solvents removed were condensed in a round-bottomed flask immersed in liquid nitrogen (filler treatment fraction).

The bath temperature was then raised to high temperature (between 100 and 200° C.) for between 30 minutes and 3 hours, while leaving the flask under vacuum ($10^{-1}$ torr) to bind the MAO to the carbon nanotubes. The flask was then placed again under a slight positive pressure of nitrogen.

Washing was then performed three times in order to remove the MAO not bound to the filler. To do this, 80 ml of dry toluene were added to the nanotubes and stirred for 5 minutes at 60° C. The MAO-treated filler was allowed to settle without stirring. The supernatant was then removed using a conditioned capillary and under a flow of nitrogen. The three solutions and the filler treatment fraction (n-heptane) were then pooled.

The small amount of residual toluene present in the flask was entrained under vacuum and concentrated in a flask immersed in liquid nitrogen so as to add it thereafter to the filler treatment fraction.

After this treatment, the flask thus contained pretreated nanotubes.

Homopolymerization of Ethylene in the Presence of Carbon Nanotubes Pretreated with the Cocatalyst It will be noted that the binding of the catalyst to the pretreated nanotubes was performed in inert medium, maintained under a slight positive pressure of nitrogen, while avoiding the presence of protic impurities and of oxygen in the reaction medium.

To perform the homopolymerization of ethylene, 100 ml of n-heptane were added to the flask containing the MAO-treated nanotubes.

The mixture was then transferred under a nitrogen atmosphere into a preconditioned round-bottomed reactor containing a magnetic stirring bar.

Between $1\times10^{-5}$ and $1\times10^{-6}$ mol of $Cp*_2ZrCl_2$ per g of nanotubes was added, under a nitrogen atmosphere. The round-bottomed reactor was then thermostatically maintained in an oil bath at between 25° and 100° C. (polymerization temperature) for between 5 and 60 minutes.

The medium was then purged for 30 seconds with a flow of ethylene. The polymerization was performed for one hour at a pressure of between 1.1 and 2.7 bars of ethylene. The composite thus synthesized was then recovered by precipitating it from methanol acidified with 12M hydrochloric acid.

Description of a First Preferred Embodiment of the Invention

1. Reagents Used:

The fillers used were multi-walled carbon nanotubes (MWNTs). Two types of nanotubes were used, i.e. crude MWNTs still containing 30% by weight of catalytic impurities (mainly about 30% by weight of alumina, 0.3% by weight of cobalt and 0.3% by weight of iron) and purified MWNTs containing traces of catalytic impurities (0.2% by weight of alumina, 0.3% by weight of iron and 0.3% by weight of cobalt).

The solvent used was n-heptane (analytical grade, from the company Acros). It was dried over molecular sieves of porosity equal to 0.4 nanometres (also supplied by the company Acros).

Certain solutions were prepared using dry toluene. To do this, the toluene (analytical grade) supplied by the company Labscan was dried by boiling it over calcium hydride, and was then freshly distilled.

The selected cocatalyst was methylaluminoxane (MAO) from the company Atofina. A 1.45M solution of MAO in toluene was used for the synthesis.

Bis(1,2,3,4,5-pentamethylcyclopentadienyl)zirconium (IV) dichloride ($Cp^*_2ZrCl_2$) (from the company Aldrich) was used herein as catalyst. It was dissolved in dry toluene so as to form a solution of about 5 mM.

The ethylene (99.998%) (from the company Air Liquide) was used as supplied, in gas form.

Methanol (technical grade) (from the company Brenntag) was used to precipitate and to recover the polymer or the composite.

2. Pretreatment of the Carbon Nanotubes with the Cocatalyst:

The crude nanotubes (0.25 g or 1 g depending on the case) were introduced into a 250 ml or 500 ml two-necked round-bottomed flask (according to the subsequent use) containing a magnetic stirring bar and equipped with a glass three-way tap (stoppered with a rubber septum).

The flask, connected to a vacuum trap immersed in liquid nitrogen in order to recover the adsorbed water, was conditioned, i.e. flame-dried under vacuum using a Bunsen burner. The nanotubes were then dried overnight at 100° C. under vacuum and with magnetic stirring. The flask was placed under a slight positive pressure of nitrogen.

100 ml of n-heptane were then introduced into the flask. An amount of MAO with an Al concentration of 1.45M (32 ml/g of MWNTs or 46 mmol/gram of MWNTs) was freed beforehand of its trimethylaluminium by evaporation to dryness under vacuum. The evaporated trimethylaluminium was condensed in a vacuum trap immersed in liquid nitrogen and stored for analysis. This removal of the trimethylaluminium (TMA) is necessary since it has been demonstrated that TMA, which is an excellent Lewis acid, is an effective competitor of MAO as regards the adsorption [7].

The solid MAO was redissolved in toluene and transferred by capillary, under nitrogen, onto the suspension of MWNTs in heptane.

The system was thermostatically maintained at 40° C. in an oil bath with magnetic stirring for one hour.

The MAO was concentrated to dryness under vacuum in the presence of the MWNTs, and the solvents removed were condensed in a round-bottomed flask immersed in liquid nitrogen (filler treatment fraction).

The bath temperature was then raised to high temperature (150° C.) for one and a half hours, while leaving the flask under vacuum ($10^{-1}$ torr) to bind the MAO to the carbon nanotubes. The flask was then placed again under a slight positive pressure of nitrogen.

Washing was then performed three times in order to remove the MAO not bound to the filler. To do this, 80 ml of dry toluene were added to the nanotubes and stirred for 5 minutes at 60° C. The MAO-treated filler was allowed to settle without stirring. The supernatant was then removed using a conditioned capillary and under a flow of nitrogen. The three solutions and the filler treatment fraction (n-heptane) were then pooled.

The small amount of residual toluene present in the flask was entrained under vacuum and concentrated in a flask immersed in liquid nitrogen so as to add it thereafter to the filler treatment fraction.

After this treatment, the flask thus contained pretreated nanotubes.

3. Homopolymerization of Ethylene in the Presence of Carbon Nanotube Pretreated with the Cocatalyst:

It will be noted that the binding of the catalyst to the pretreated carbon nanotubes was performed in inert medium, maintained under a slight positive pressure of nitrogen, while avoiding the presence of protic impurities and of oxygen in the reaction medium.

To perform the homopolymerization of ethylene, 100 ml of n-heptane were added to the flask containing the MAO-treated nanotubes (0.25 g).

The mixture was then transferred into a preconditioned round-bottomed reactor containing a magnetic stirring bar.

2.2 ml of the solution of 5 mM $Cp^*_2ZrCl_2$ (11.5 µmol for the 0.25 g of nanotubes) [lacuna]. The round-bottomed reactor was then thermostatically maintained in an oil bath at 50° C. (polymerization temperature) for 15 minutes.

The medium was then purged for 30 seconds with a flow of ethylene. The polymerization was performed for one hour at a pressure of 2.7 bars of ethylene. The composite thus synthesized was then recovered by precipitating it from methanol acidified with 12M hydrochloric acid.

4. Results 4.1. Absence of Catalytic Activity Associated with the Carbon Nanotubes Alone:

It will be noted that, for the needs of the test, the polymerization time period was reduced from 60 to 30 minutes.

It was demonstrated that the crude carbon nanotubes showed no catalytic activity in the polymerization of ethylene.

To do this, polymerization reactions were performed under various conditions corresponding to various samples, and the results obtained are presented in Table 1.

As shown by this Table 1, when the polymerization is performed in the absence of the MAO cocatalyst (see samples 24b and 28a), no polymer is obtained, whereas a small amount of polyethylene was obtained in the presence of MAO (see sample Dabo24a).

Verification was made that the product obtained in the presence of MAO was indeed polyethylene (data not presented herein).

Figure 2:
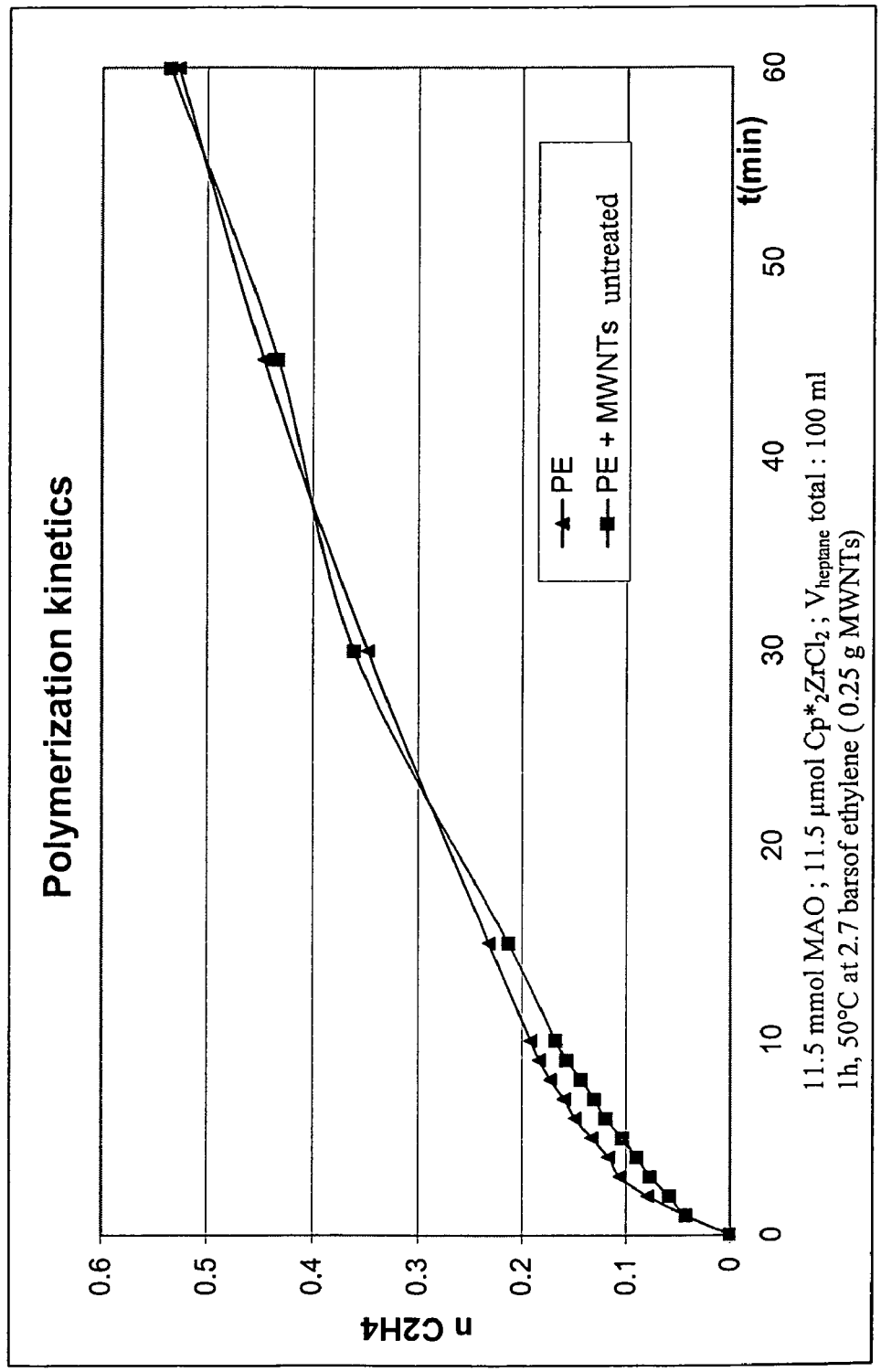
FIG. 2 presents a comparison of the polymerization kinetics curves for the polymerization of ethylene in the presence and in the absence of crude multi-walled carbon nanotubes (MWNTs).

4.2. Absence of Poison Effect on the Carbon Nanotubes with Respect to the Catalytic Couple:

Tests, the results of which are presented in Table 2 and in FIG. 2, made it possible to demonstrate that the crude multi-walled nanotubes did not constitute a poison for the MAO/$Cp^*_2ZrCl_2$ catalytic couple.

Specifically, if the consumption of ethylene over time for a polymerization performed in the absence and in the presence of non-pretreated crude multi-walled carbon nanotubes is compared, it is observed that the catalytic activity is identical in both cases (see Table 2) and that the ethylene consumption curves are virtually superimposed in both cases (see FIG. 2).

It will be noted that the catalytic activity is defined as the amount in kg of polyethylene (PE) produced per mole of Zr and per hour.

4.3. Use of Carbon Nanotubes as Catalysis Support in the Polymerization of Ethylene:

It has been demonstrated according to the present invention, entirely surprisingly, that the carbon nanotubes can be used as catalysis support for the MAO/$Cp^*_2ZrCl_2$ couple in the polymerization of ethylene.

This result is all the more surprising since a person skilled in the art, knowing the abundance of π electrons on the carbon nanotubes, which make them efficient Lewis bases and thus theoretically capable of competing with olefinic monomers, for instance ethylene, would on the contrary have expected deactivation or even inhibition of the polymerization.

Figure 3:
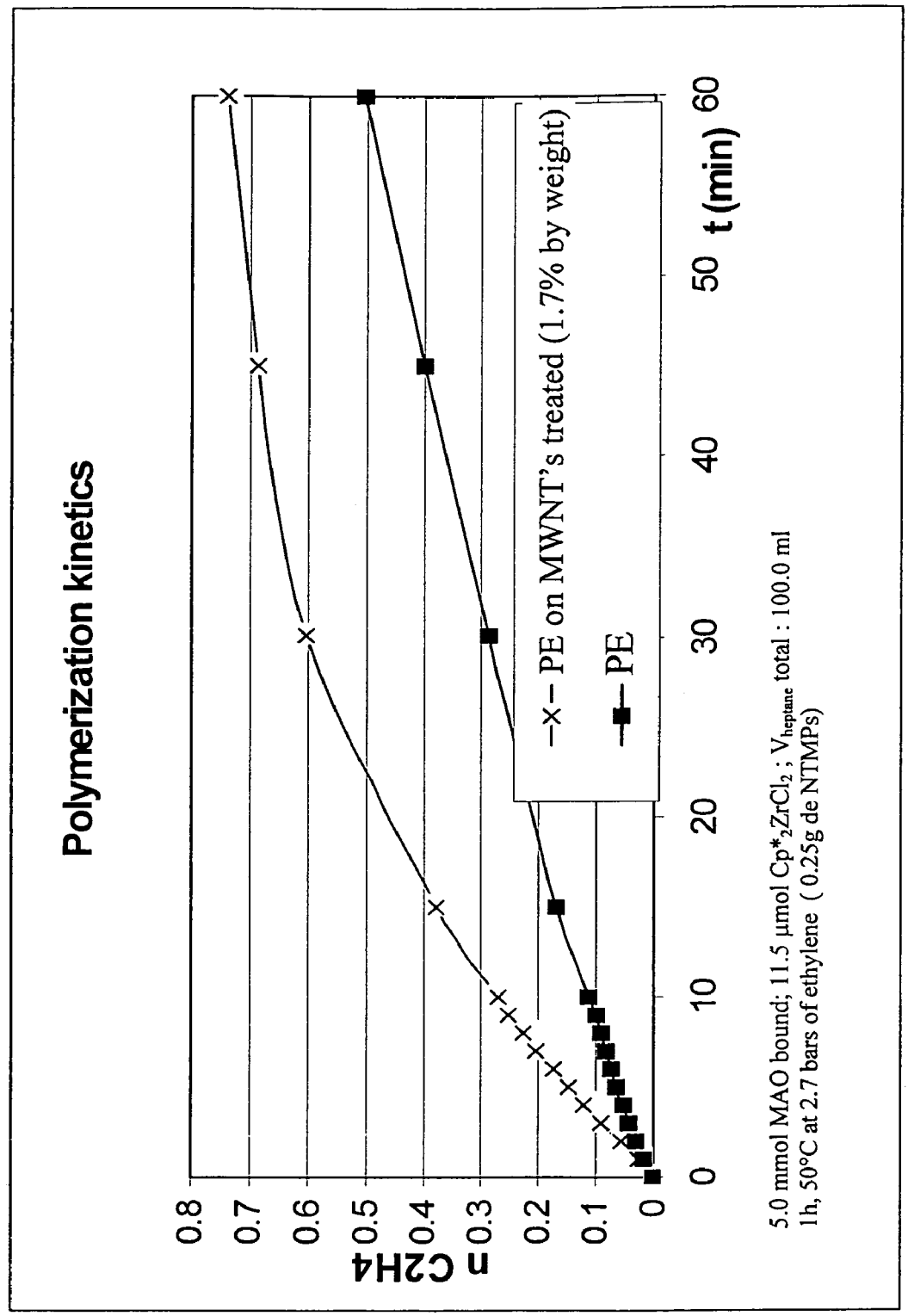
FIG. 3 presents a comparison of the kinetics curves for the polymerization of ethylene according to the process of the invention using a catalytic system comprising or not comprising crude multi-walled carbon nanotubes.

To do this, polymerization tests in the presence and absence of pretreated crude multi-walled carbon nanotubes were performed, and the results of these tests are presented in Table 3 and in FIG. 3.

As shown by Table 3, a 50% increase in the catalytic activity is observed for the sample Dabo 21, corresponding to a polymerization in the presence of pretreated nanotubes, compared with that obtained for the sample Dabo23 (in the absence of said nanotubes). This means that the catalytic system formed by the catalytic couple of cocatalyst/catalyst supported by carbon nanotubes has catalytic activity in the polymerization of ethylene higher than that of the couple alone.

Comparison of the polymerization kinetics as presented in FIG. 3 confirms these results.

4.4. Thermal Characterization of the PE/Crude MWNT Composites:

Composites with an increasing content of polyethylene were synthesized by taking various fractions during polymerization, and the change in the melting point and that of the degree of crystallinity during polymerization were measured using these various composites by differential scanning calorimetry (DSC) and by thermogravimetric analysis (TGA).

The corresponding results are presented in Table 4. As these results show, there is an increase in the melting point gradually as the proportion of synthesized polyethylene increases, whereas the degree of crystallinity also increases until it reaches a threshold value (66%).

These results demonstrate the formation of composites with an increasing proportion of polyethylene. Furthermore, the thermal properties of these compounds increase as the proportion of polyethylene they contain increases.

4.5. Morphological Characterization of the Crude PE/MWNT Composites:

FIGS. 4a to 4f show SEM microphotographs obtained for various crude PE/MWNT composites comprising variable weight contents of polyethylene relative to the carbon nanotubes and ranging from 0% to 42%.

Figure 4A:
FIG. 4a corresponds to an SEM electron microphotograph taken on a sample of crude MWNT carbon nanotubes.
Figure 4B:
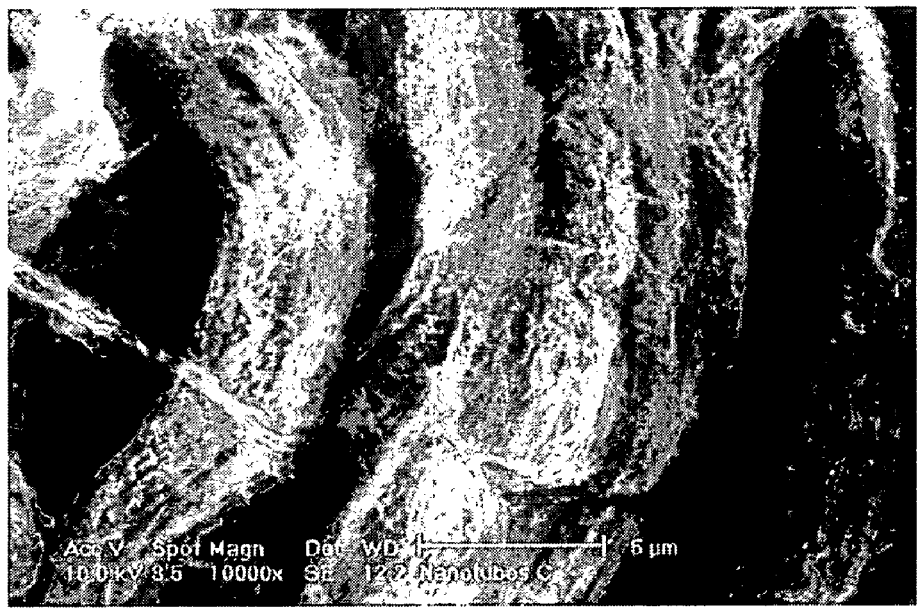
FIG. 4b corresponds to a zoom taken on the sample of FIG. 4a to visualize the bundles or aggregates.
Figure 4C:
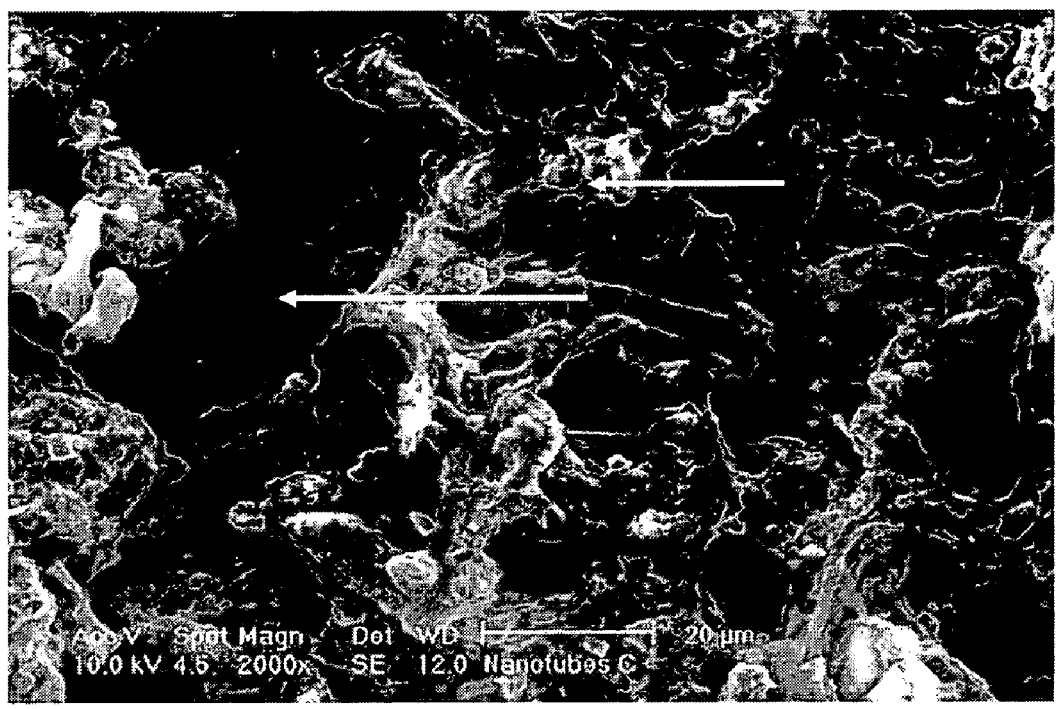
FIG. 4c corresponds to an SEM electron microphotograph taken on a sample containing crude MWNT nanotubes with 10% by weight of polyethylene and obtained with binding of MAO cocatalyst according to the process of the invention.
Figure 4D:
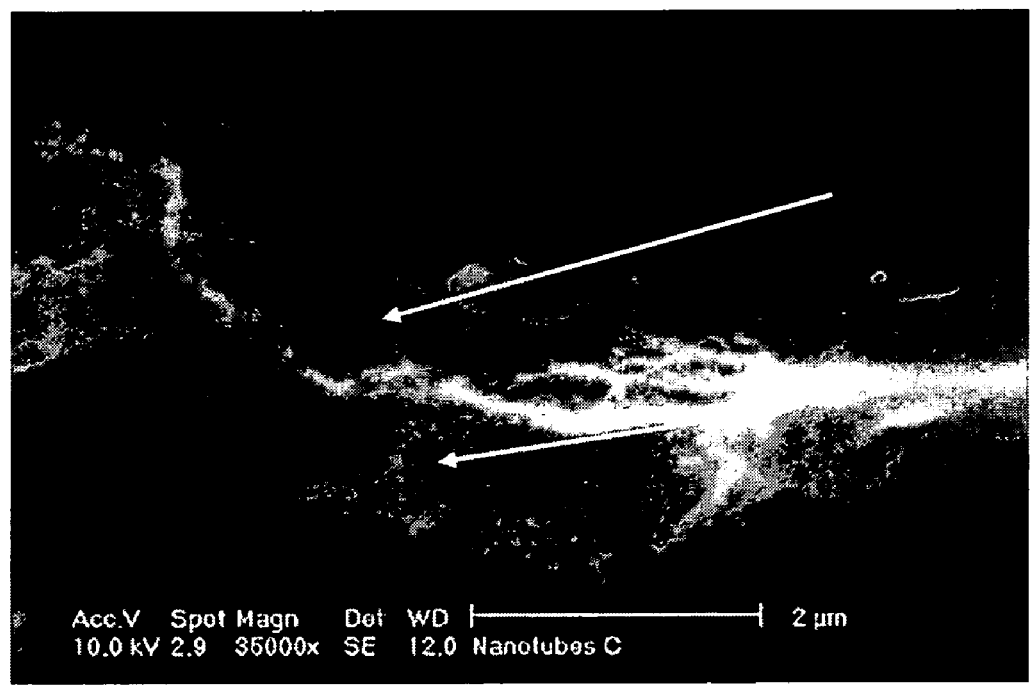
FIG. 4d corresponds to a zoom taken on the sample of FIG. 4c.
Figure 4E:
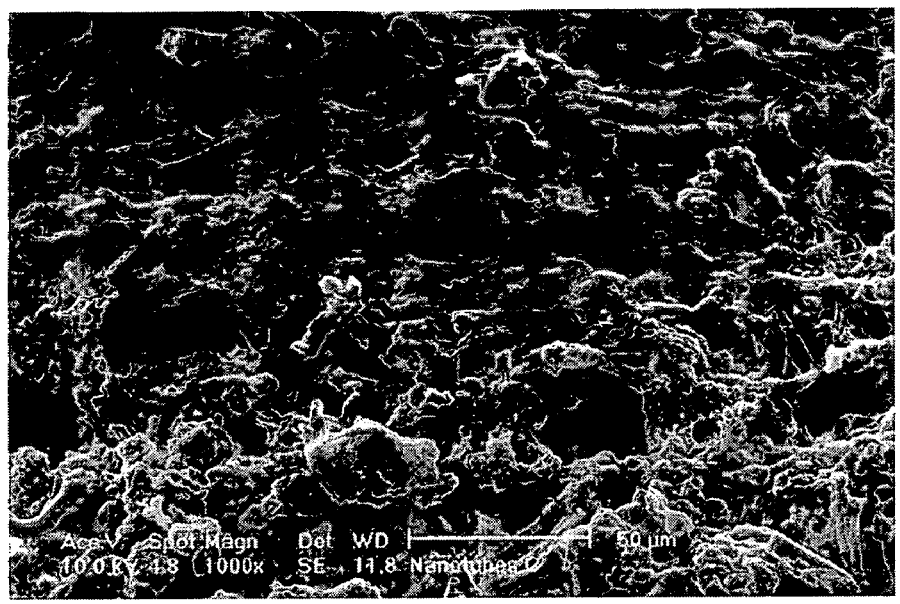
FIG. 4e corresponds to an SEM electron microphotograph taken on a sample containing crude MWNT nanotubes with 42% by weight of polyethylene and obtained with binding of MAO cocatalyst according to the process of the invention.
Figure 4F:
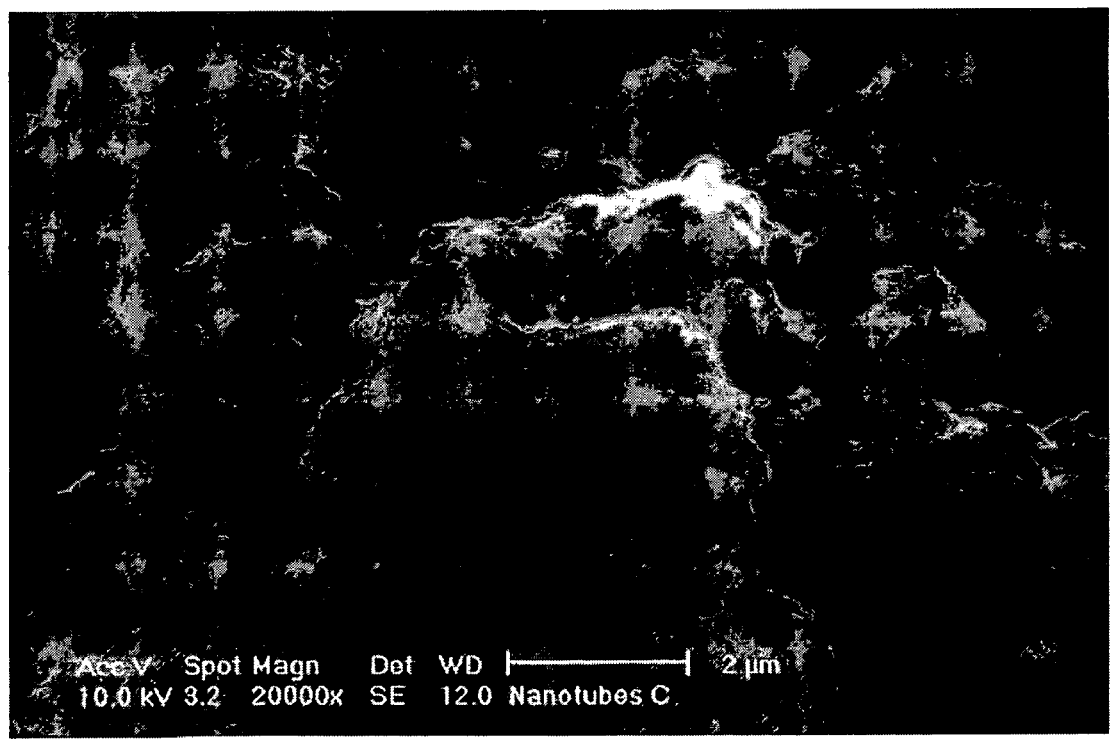
FIG. 4f corresponds to a zoom taken on the sample of FIG. 4e.

In a sample containing only carbon nanotubes, it is observed, as shown in FIGS. 4a and 4b, according to a phenomenon well known to those skilled in the art, that these carbon nanotubes have a natural and spontaneous tendency to aggregate in the form of packets, lumps or bundles. These bundles are indicated by an arrow.

Using this sample as a point of comparison, it is found that as the weight content of synthesized polyethylene in the composite increases, these bundles have an increasing tendency to deaggregate (FIGS. 4c to 4f).

It will be noted that complementary morphological analyses performed by scanning electron microscopy (SEM) (not shown herein) confirmed this tendency towards destructuring of the "bundles" of carbon nanotubes for contents of from 50% to 75% by weight of polyethylene In order to visualize the coating of the nanotubes, various samples were analysed by transmission electron microscopy (TEM), these samples containing 0%, 42% and 74% by weight of polyethylene. The photographs obtained for these various samples are shown in FIGS. 5a to 5c.

Figure 5A:
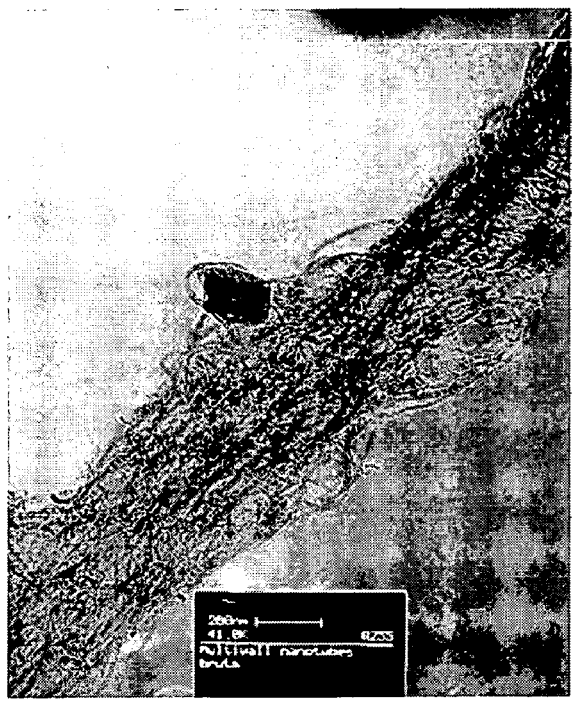
FIG. 5a is a microphotograph taken by transmission electron microscopy (TEM) of the sample photographed in FIGS. 4a and 4b and corresponding to crude MWNT carbon nanotubes alone.

As may be seen, for the sample corresponding to polyethylene-free crude MWNT nanotubes, "bundles" of carbon nanotubes are observed (see FIG. 5a). These bundles contain nanotubes of various diameters ranging from about 10 to about 40 nanometres. They are several micrometres long. It will be noted that the object visible at the centre of the photograph might be likened to a catalyst particle (containing cobalt and iron) used for the production of nanotubes.

Figure 5B:
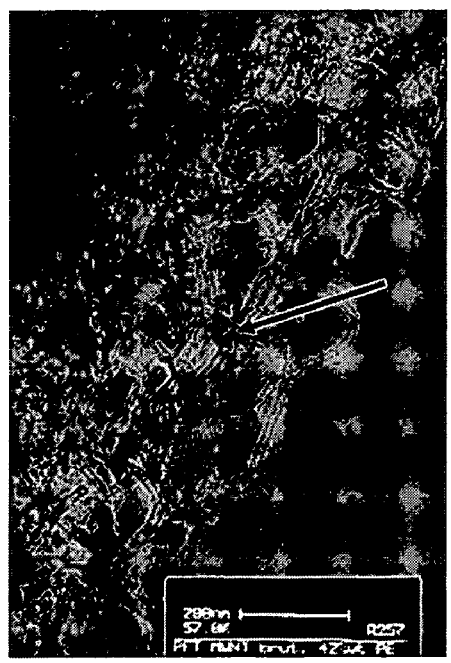
FIG. 5b is a microphotograph taken by transmission electron microscopy (TEM) of the sample photographed in FIGS. 4e and 4f and corresponding to crude MWNT nanotubes with 42% by weight of polyethylene.

On the other hand, for a sample corresponding to crude nanotubes containing 42% by weight of polyethylene (FIG. 5b), partial coating of the carbon nanotubes with polyethylene is observed on the edges of the sample (see the arrow in FIG. 5b).

Figure 5C:
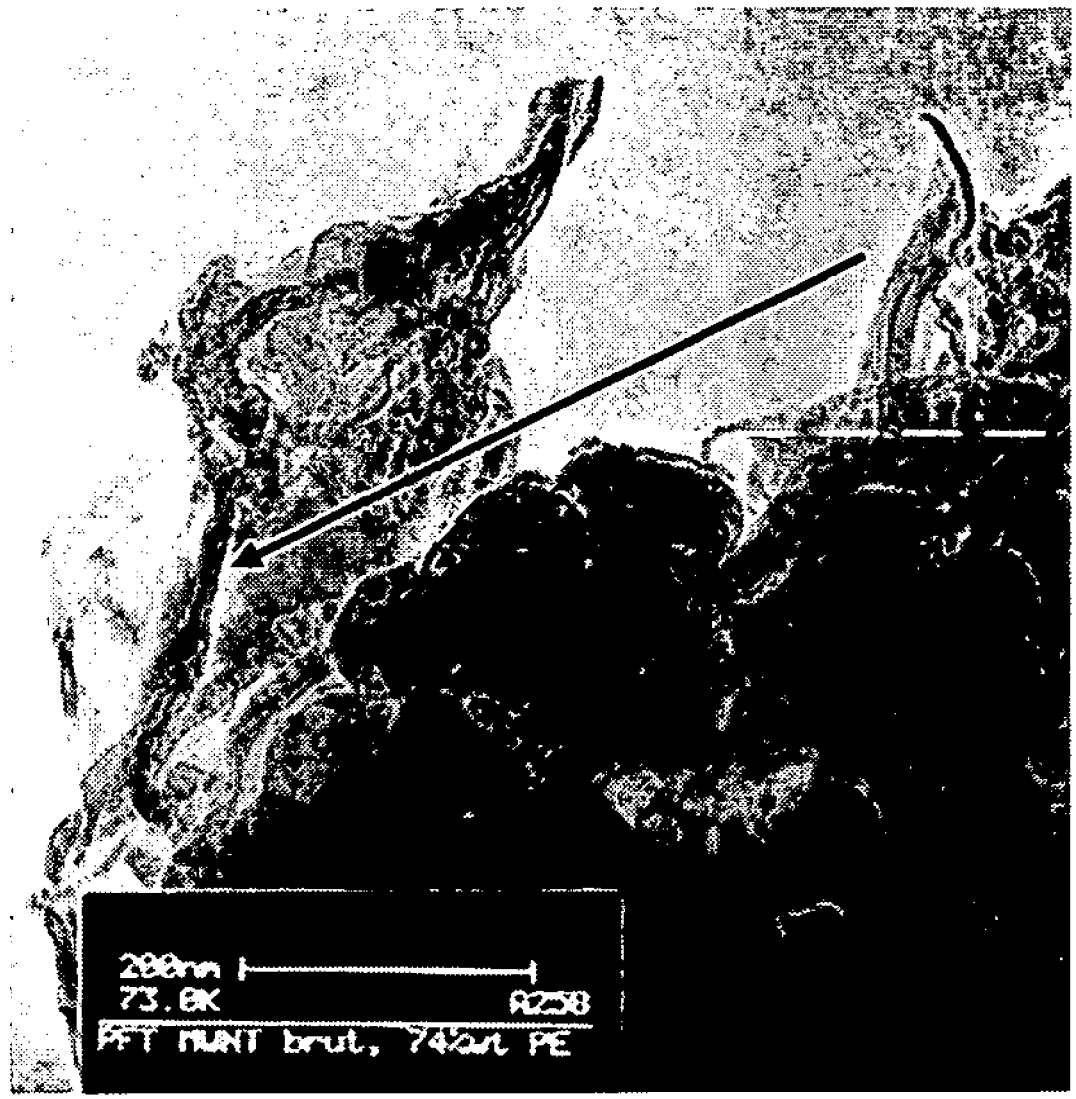
FIG. 5c is a microphotograph taken by transmission electron microscopy (TEM) of a sample corresponding to crude MWNT nanotubes with 74% by weight of polyethylene and obtained with binding of MAO cocatalyst according to the process of the invention.

In comparison, as shown in FIG. 5c, the proportion of crude nanotubes coated (covered) with polyethylene increases for a sample containing a greater proportion of polyethylene (crude nanotubes containing 74% by weight of polyethylene). In this figure, the coated nanotubes are indicated by a black arrow, whereas the areas very rich in polyethylene are indicated by a dashed arrow. This coating is especially visible on the edges of the sample.

4.6. Effect of Purification of the Carbon Nanotubes on the PE/MWNT Composite Obtained:

A measurement of the catalytic activities similar to that described above for crude carbon nanotubes was performed with purified carbon nanotubes (data not shown).

This study made it possible to demonstrate that the catalytic system in which the support consists of purified carbon nanotubes is just as efficient in terms of catalytic activity as that in which the support consists of crude carbon nanotubes.

In a similar manner to the study presented above for composites in which the multi-walled nanotubes were crude, a study was performed on PE/multi-walled nanotube (MWNT) composites in which the carbon nanotubes had been purified.

The results obtained (not shown herein) demonstrated that the thermal properties and the morphological characteristics of these PE/multi-walled carbon nanotube composites obtained with purified carbon nanotubes were comparable with those obtained with crude carbon nanotubes.

In addition, these results made it possible to show that less polyethylene was needed to destructure the "bundles" of carbon nanotubes when they are purified than when they are crude. This may be explained by the fact that the purification of the carbon nanotubes reduces their structuring in bundles. Specifically, purification makes it possible to remove the catalytic residues located at the base of the "bundles", which partly ensure their cohesion.

4.7. Use of PE/MWNT Nanotube Composites as Masterbatches for Preparing Composites:

In order to be able to determine the provision of polymerization of ethylene on the MAO-treated crude multi-walled carbon nanotubes according to the present invention, melt blends were prepared.

In order for these blends to be comparable, the matrix needed to be identical. To do this, an HDPE matrix (from the company Dow) with a melt flow index by mass of 1.1 g/10 minutes under 2.16 kg and 190° was used.

The preparation of these blends with this matrix was performed by blending in a closed internal chamber (Brabender), followed by forming of the material thus obtained by compression in a mould.

More specifically, the polymer matrix and the filler (polyethylene-coated carbon nanotubes) were melted and mixed together in the closed-chamber blender. Once this material was molten and thoroughly mixed, it was transferred into a suitable stainless-steel mould whose surface is covered with a Teflon film. The whole was then hot-pressed (to fully take the shape of the mould) and then cold-pressed (to set the material) by means of a hydraulic press. Composite plaques 3 mm thick were thus obtained.

The blender used herein was a Brabender internal blender (~70 g of polymer) and the press was an Agila PE20 hot/cold hydraulic double press. The blending was performed at 190° C. (screw speed: 45 rpm) for a time period of 2 minutes to melt and mix the HDPE alone and then for 10 minutes to mix it with the filler. The pressing procedure was as follows: 3 minutes at low pressure and at 190° C., three minutes at 150 bars and at 190° C. and finally five minutes without heating, at a pressure of 150 bars.

Three mixtures were thus prepared by blending in an internal chamber. These were the HDPE matrix alone (sample Dabo 40a), the HDPE matrix containing 2% by weight of crude MWNTs not pretreated with MAO (sample Dabo 40b) and the matrix containing 2% by weight of crude MWNTs treated with MAO and coated via in situ polymerization of ethylene, used in masterbatch form (sample Dabo 40c). This "masterbatch" is in fact obtained by combining several samples obtained from the polymerization of ethylene on the MAO-treated crude multi-walled carbon nanotubes according to the process of the invention and from which samples were taken during polymerization. In this "masterbatch", the proportion of polyethylene generated in situ according to the process of the invention is about 70% by weight relative to the amount of crude MWNTs.

4.7.1. Mechanical and Viscoelastic Properties

On each of the mixtures, the mechanical properties were determined by means of tensile tests and averaged over a minimum of 5 samples. The tensile speed was 50 mm/minute. Furthermore, the viscoelastic properties were also determined using a "Melt Flow Indexer" (MFI).

The results obtained are summarized in Table 5.

The parameters summarized in this table are well known to those skilled in the art. As a reminder, the mechanical parameters of a sample are defined in this table in the following manner:

the Young's modulus (E) is the characteristic of the initial strain strength of the material (rigidity);

the "yield point stress" and the "yield point strain" correspond, respectively, to the stress value and the elongation value at the flow threshold ($\sigma_s$, $\epsilon_s$);

the "MFI" characterizes the melt viscosity of the material.

The results of Table 5 show that the addition of nanotubes does not significantly influence the rigidity of the HDPE matrix (see third column of Table 5, "Young's modulus").

On the other hand, the addition of these nanotubes is accompanied by a decrease in the breaking strain (second column of Table 5).

However, the use of the "masterbatch" makes it possible to conserve ultimate properties such as the relatively high breaking stress and breaking strain, which are characteristic of maintenance of the ductility of the material (comparison between samples Dabo 40b and Dabo 40c).

As regards the viscoelastic properties (final column of Table 5, "MFI"), the addition of MWNT carbon nanotubes greatly reduces the MFI, i.e. the addition of the carbon nanotubes tends to increase the melt viscosity of the material.

However, by comparison, the pretreatment by polymerization of ethylene on MAO-treated nanotubes according to the process of the invention leads to a smaller reduction in the MFI factor, i.e. the increase in the melt viscosity is smaller than with a simple mixture (Dabo 40b). This may be explained by the fact that the process according to the invention allows better dispersion of the carbon nanotubes and thus an MFI factor that is relatively higher compared with the simple mixture. The better dispersion of the MWNTs and thus the destructuring of the "bundles" are quite probably the cause of this increase in melt viscosity, which increases the flow of the matrix through the standardized die.

In conclusion, the pretreatment of carbon nanotubes by polymerization of ethylene on MAO-treated nanotubes according to the invention makes it possible to improve the mechanical properties of the composite obtained insofar as it allows a better compromise between the rigidity and the ductility of the material, while at the same time maintaining a viscosity that is suited to the intended use of the material.

4.7.2. Thermal Properties

Thermal analyses, by differential scanning calorimetry (DSC) and by thermogravimetric analysis (TGA), were performed and compared for the various mixtures. The data obtained are summarized in Table 6 and in FIG. 6.

These data demonstrate that the melting point is slightly higher for the composites than for the matrix alone (first column, "m.p." of Table 6).

Very interesting data are constituted by the fact that for the composite containing the nanotubes pretreated with MAO and coated with polyethylene according to the process of the invention (sample Dabo 40c), the gain in heat stability is even better than for the simple mixture.

It is also found, very advantageously, that in the presence of crude MWNTs (Dabo 40b and Dabo 40c entries), the degradation temperature in an oxidizing atmosphere (in air) of the HDPE matrix is markedly higher (about 50° C.) compared with that of the HDPE matrix alone (sample Dabo 40a) ("$T_{deg.}$ in air" column). This is clearly demonstrated in the thermograms of FIG. 6.

In other words, whereas the simple mixing of carbon nanotubes with the HDPE matrix makes it possible to improve the stability of the HDPE matrix, it emerges from the present invention that the presence of carbon nanotubes, even in an amount as small as 2% by weight, which have undergone the treatment according to the process of the invention, makes it possible to even further improve this heat stability.

4.7.3. Fire Behaviour

The test performed consisted in burning a sample and in observing the behaviour of the material during combustion: possible formation of ignited drops capable of propagating the fire to the surrounding medium, deformation of the material, intensive volatilization, etc.

When the sample corresponding to the HDPE matrix alone (Dabo 40a) was ignited, it burned generating ignited drops. The propagation of the flame along the sample was rapid, leading to the combustion of all of the initial sample.

Figure 7:
FIG. 7 is a photograph taken after combustion of the sample Dabo40b as defined in the preceding paragraph.

In comparison, the combustion of the sample corresponding to a composite with an HDPE matrix containing 2% by weight of crude MWNTs obtained by simple mixing (Dabo 40b), there was no longer any formation of ignited drops. The propagation of the flame was slower than in the case of the HDPE matrix alone. After combustion, the sample, although deformed, as shown by FIG. 7, conserved overall its initial dimensions. This observation is typical of the "charring" phenomenon resulting from the carbonization of the organic matrix induced by the presence of nanofillers and resulting in the formation of a carbonized crust ("char").

Figure 8:
FIG. 8 is a photograph taken after combustion of the sample Dabo40c as defined in this same paragraph.
Figure 10A:
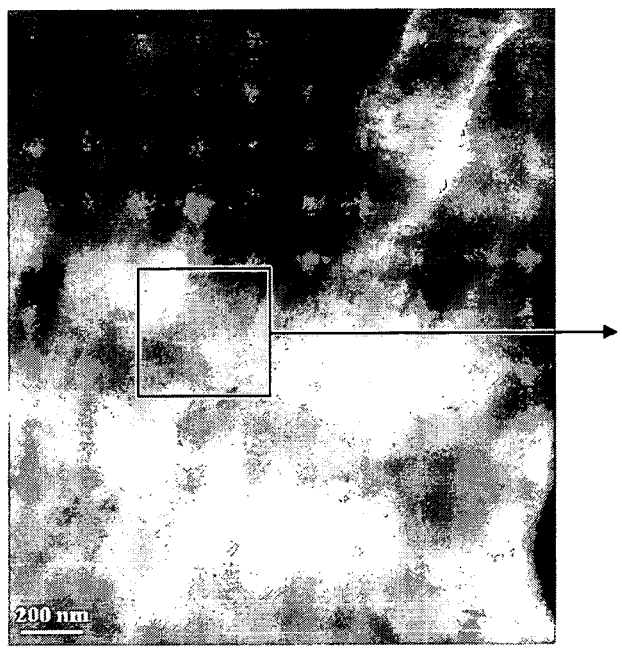
FIG. 10a is a TEM microphotograph of the same sample Dabo40c and FIG. 10b corresponds to a zoom showing an isolated MWNT carbon nanotube.
Figure 10B:
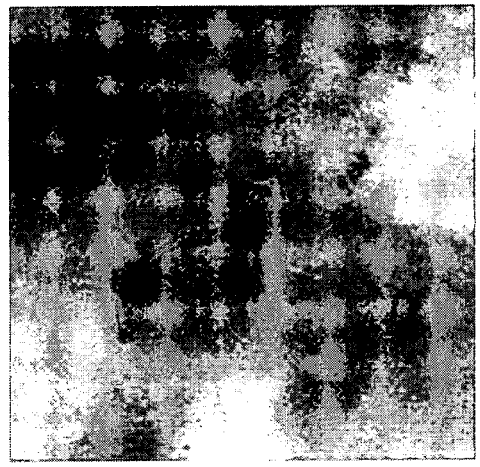

The treatment of the carbon nanotubes according to the invention does not in principle make it possible to further improve the fire behaviour of the HDPE matrix, as evidenced by FIG. 8 (sample Dabo 40c), compared with carbon nanotubes not treated according to this process (sample Dabo 40b).

Nevertheless, the behaviour of this composite with an HDPE matrix containing 2% by weight of crude MWNTs treated according to the process of the invention appears to be better than that of the matrix alone. As in the case of the composite containing untreated carbon nanotubes, the formation of a crust ("char") in the total absence of ignited flow is observed (see FIG. 8).

In conclusion, the incorporation of carbon nanotubes treated according to the process of the invention into an HDPE matrix allows the formed composite to burn without formation of ignited droplets and with a much slower propagation speed compared with the HDPE matrix alone. However, in principle, there does not appear to be any significant difference in the fire behaviour between the composites obtained by simple mechanical mixing of HDPE and of crude MWNT nanotubes and those obtained by mixing HDPE and MWNTs treated according to the process of the invention.

4.7.4. Morphological Characterizations

So as to visualize the state of deaggregation of the carbon nanotubes, morphological characterizations by transmission electron microscopy (TEM) were performed on the two composites Dabo 40b and Dabo 40c obtained, respectively, by mixing HDPE and crude MWNTs, on the one hand, and by mixing HDPE and MWNTs treated according to the process of the invention, on the other hand. The corresponding photographs are presented in FIGS. 9a, 9b and 10a, 10b, respectively.

It is seen that the melt blending of the crude MWNTs with HDPE (composite Dabo 40b) is not efficient enough to deaggregate the "bundles" of nanotubes. Specifically, in FIGS. 9a and 9b of this composite, "bundles" of nanotubes may be seen (see arrows and magnification).

By comparison, the morphological analysis performed by transmission electron microscopy (TEM) on the composite Dabo 40c containing the carbon nanotubes treated according to the process of the invention reveals better dispersion of the carbon nanotubes within the matrix (see FIGS. 10a and 10b), since the "bundles" of nanotubes can no longer be seen. In contrast, carbon nanotubes that are relatively separated from each other are seen (see FIG. 10a). The dispersion of the nanotubes appears to be relatively homogeneous throughout the sample.

In conclusion, the observations made by transmission electron microscopy (TEM) demonstrate the advantage of the process of the invention, which allows, by means of coating the carbon nanotubes, deaggregation of the "bundles" that they have a natural tendency to form, and, as a result, relatively homogeneous dispersion of these nanotubes in a polyethylene matrix by melt blending. It may thus genuinely be considered that the addition of the masterbatch to the HDPE matrix results in the formation of a nanocomposite within the strict meaning of the term.

In contrast, melt blending of the untreated carbon nanotubes and of HDPE does not lead to the production of a nanocomposite, but to the production of a microcomposite for which "bundles" of nanotubes are found in the polyethylene.

Description of a Second Preferred Embodiment of the Invention

Polyethylene-based nanocomposites comprising double-walled carbon nanotubes (DWNTs) as fillers were also prepared according to the process of the present invention. The experimental conditions were as follows.

0.8 gram of DWNTs was dried overnight under reduced pressure at 105° C. A solution of MAO freed of TMA (46.5 ml of a solution with an aluminium concentration of 0.8 M) was added to the nanotubes. After removal of the solvents in order to promote the binding of the MAO to the carbon nanotubes, the mixture was heated at 150° C. for 90 minutes. The non-bound MAO was removed by washing with dry toluene and was titrated to determine the amount of bound MAO (24.6 mmol bound). 200 ml of n-heptane and 18.4 µmol of $Cp^*_2ZrCl_2$ were added to the MAO-treated DWNTs. The polymerization was performed at a pressure of 1.1 bar of ethylene and at 50° C. Various sample fractions of composites (nanocomposites) were taken during the synthesis of the polyethylene and precipitated from acidified methanol for analysis. Prior to the analysis, the nanocomposites, with an increasing content of polyethylene, were dried at 150° C. for 90 minutes under vacuum.

A DSC analysis in closed capsules was then performed and demonstrated that the melting point and the degree of crystallinity increased as the polyethylene content in the nanocomposite increased (data not shown).

An analysis of the nanocomposites by TGA was also performed and confirmed the results obtained by DSC and that nanocomposites with an increasing content of polyethylene were indeed obtained when the sampling time period increased (data not shown).

Description of a Third Preferred Embodiment:

In a third preferred embodiment, polyethylene-based nanocomposites comprising single-walled carbon nanotubes (SWNTs) as fillers were prepared according to the process of the present invention. The experimental conditions were the same as those described in the first embodiment for nanotubes of MWNT type.

A comparison of the results obtained for the composite thus produced according to the process of the invention with those obtained for a polymer obtained by simple polymerization of ethylene is presented in Table 7.

As illustrated in this Table 7, compared with a simple polymerization in the absence of nanotubes, the process of the present invention using carbon nanotubes of SWNT type as fillers makes it possible to increase the catalytic activity of the polymerization.

Figure 11:
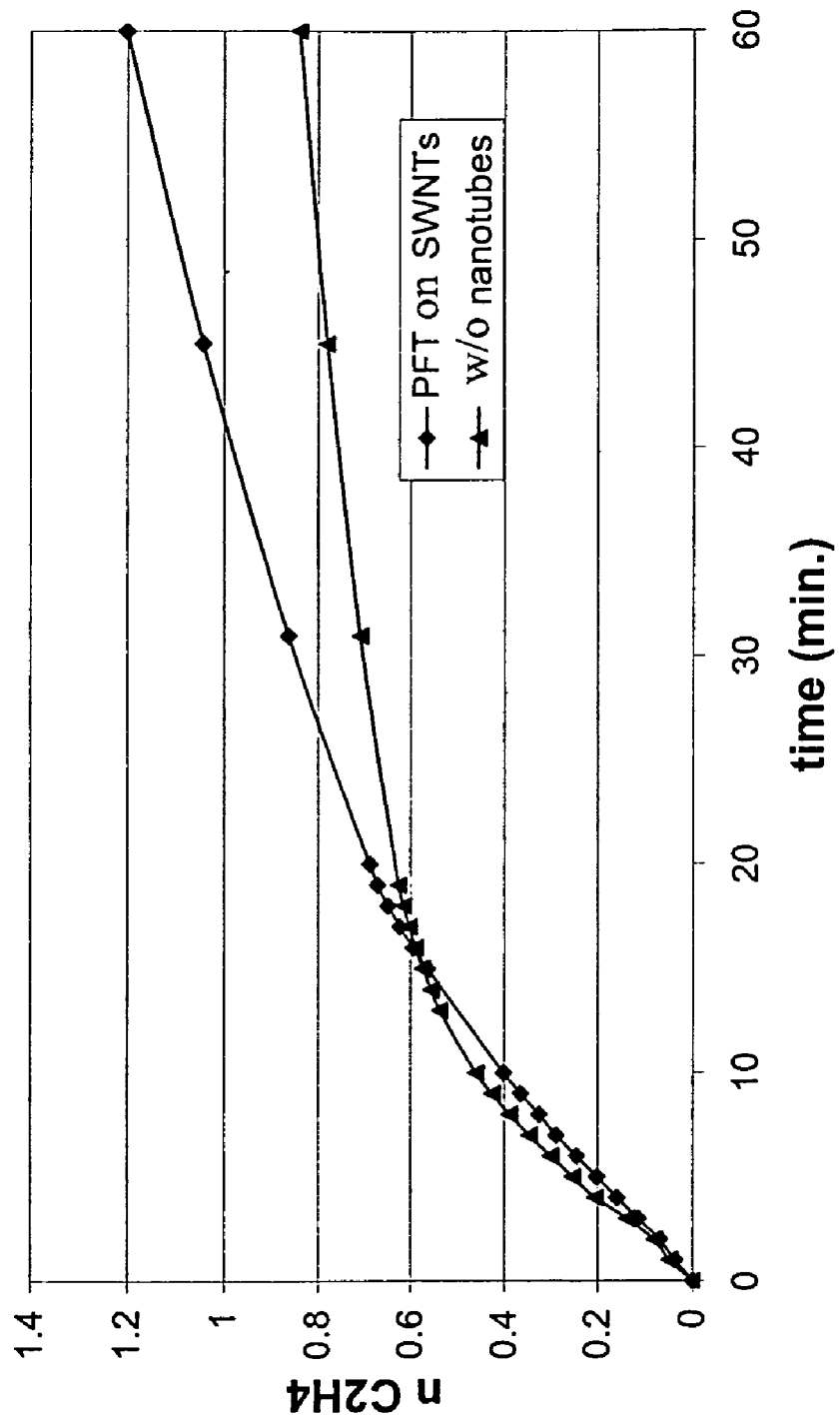
FIG. 11 compares the polymerization kinetics for a simple polymerization of ethylene and for a polymerization of ethylene performed on single-walled carbon nanotubes (SWNTs) according to the process of the invention.

In addition, a comparative study of the polymerization kinetics for a simple polymerization and for polymerization in the presence of nanotubes of SWNT type according to the process of the invention as described above demonstrated that these kinetics were comparable during the first twenty minutes, but that thereafter the rate of the simple polymerization begins to attenuate whereas the rate of the polymerization according to the invention continues to increase (see FIG. 11).

A thermal analysis of two samples obtained by simple polymerization (Dabo B 013a) and by polymerization on SWNT nanotubes according to the invention (composite Dabo B 012) was also performed, and the results are presented in Table 9.

It emerges from this analysis that the polymer alone obtained by simple polymerization has a lower melting point than that of the composite obtained according to the invention, but that its degree of crystallinity is higher.

A thermal study of polyethylene-based nanocomposites comprising carbon nanotubes of SWNT type and obtained according to the invention with an increasing polyethylene content was performed, the results of which, presented in Table 8, made it possible to demonstrate that the products obtained for an increasing sampling time period did indeed correspond to composites with an increasing polyethylene content and that for an increasing amount of polyethylene formed, an increase in the melting point and an increase in the degree of crystallinity could be observed.

Description of a Fourth Preferred Embodiment

A composite material was prepared according to the process of the invention described in detail in the first embodiment, but with a few differences. A minimum amount of 1.23 mmol of MAO was used, since previous experiments had demonstrated that there was always polymerization of the ethylene on the carbon nanotubes with this amount of MAO.

In addition, the step for removal of the TMA and the steps of washing of the carbon nanotubes after heating them to 150° C. were eliminated. Furthermore, 1 g of MWNTs was treated with MAO containing 4.9 mmol of aluminium and using 40 ml of n-heptane.

For the homopolymerization of ethylene, 175 ml of n-heptane and 16.4 μmol of $Cp*_2ZrCl_2$ were used.

With the aim of using it as a "masterbatch", the composite thus obtained was subjected to thermogravimetric analyses. The analyses revealed that the composition of the composite was as follows:

- 39.7% by weight of polyethylene (obtained by TGA in helium 20° C./minute)
- 5.8% by weight of alumina (obtained by TGA in air 20° C./minute)
- 54.5% by weight of MWNTs (determined by subtraction given the amount of polyethylene and of alumina).

Verification was made that polyethylene (PE) had indeed been synthesized (by differential scanning calorimetry analysis (DSC)): the characteristic melting point of the PE measured was 134.4° C. (determined during the second passage in cyclic DSC (10° C./minute)) and the degree of crystallinity was 51% (calculated from the heat of fusion during the second passage in cyclic DSC).

This masterbatch thus obtained was redispersed by extrusion/injection in a high-density matrix (HDPE) of commercial type (from the company Dow, of $MI_2$=1.1 g/10 minutes) so as to obtain a new composite. The experimental conditions were as follows:

- operating temperature: 190° C.
- admission period: 4 minutes at 30 rpm
- recirculation period: 6 minutes at 60 rpm
- recovery: 2 minutes at 60 rpm
- injection chamber temperature: 190° C.
- injection temperature (mould): 100° C. (each process run results in the production of two tensile test samples).

In parallel, samples containing either polyethylene alone or composites obtained by simple direct mixing and comprising polyethylene and 1% by weight of multi-walled carbon nanotubes (MWNTs) were prepared.

The three types of sample were then subjected to tensile tests with a tensile speed of 50 mm/minute, and the results are presented below.

Breaking Stress and Elongation at Break:

As illustrated by FIGS. 12 and 13, the ultimate properties (breaking stress and elongation at break) are much better for the composite obtained by redispersion of the masterbatch according to the invention than for polyethylene alone and the composite obtained by direct mixing.

Young's Modulus:

FIG. 14 shows that the Young's modulus values for the various materials obtained during the injection are within the same range of values and that these values are located within the relative measurement errors for each of the materials.

Figure 16:
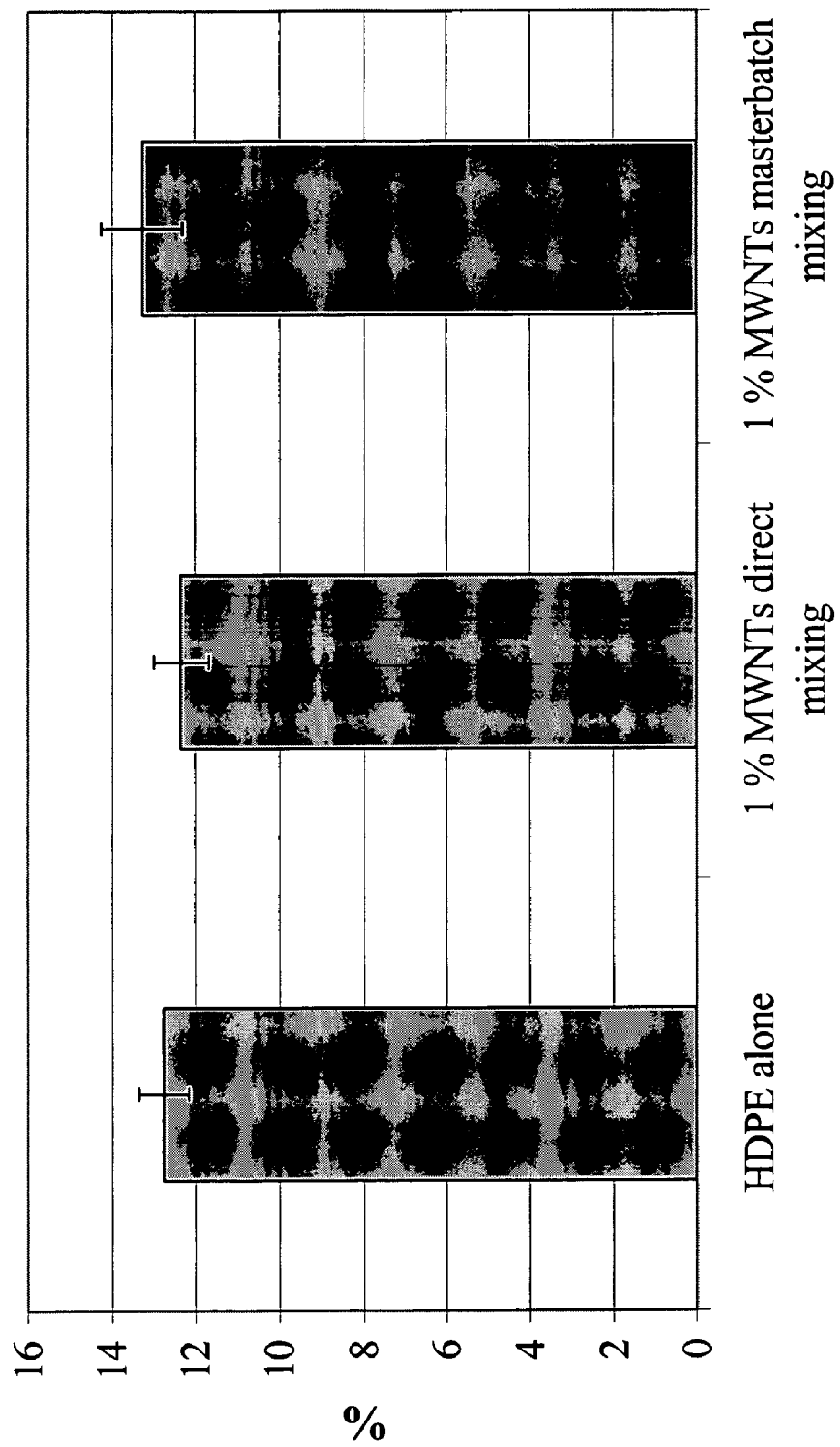

Stress and Elongation at the Yield Point:

The same observations were made for the values obtained for the yield point stress (FIG. 15) and the elongation at the yield point (FIG. 16).

In conclusion, the results obtained demonstrate that the use of a composite based on a polymer matrix and comprising as filler carbon nanotubes obtained according to the invention and used as masterbatch makes it possible to increase the ultimate properties especially compared with a polymer alone, but also compared with a composite obtained by direct mixing of said polymer and of said filler. In other words, the process according to the invention makes it possible to obtain nanocomposites in which there is a transfer of the ultimate properties of the carbon nanotubes to the composite, as desired.

Additional tests should make it possible to demonstrate that this transfer of the properties of the carbon nanotubes to the composite also concerns other physical properties.

Tables

TABLE 1

| Sample | $Cp*_2ZrCl_2$ (μmol) | MAO (mmol) | Mass of crude MWNTs used (g) | Total mass obtained (g) | Max. weight of PE obtained (g) | m.p. (° C.) | Degree of crystallinity of the PE (weight %) |
|---|---|---|---|---|---|---|---|
| 24 a | 0 | 11.5 | 0.1 | 0.240 | 0.140 | 128.3 | 18 |
| 24 b | 11.5 | 0 | 0.1 | 0.100 | 0 | / | / |
| 28 a | 0 | 0 | 0.1 | 0.100 | 0 | / | / |
| 28 b | 0 | 11.5 | 0 | 0.038 | 0.038 | 131.0 | 25 |

Furthermore, an MWNT-based "masterbatch" was synthesized and its composition was also determined as being 39.7% by weight of polyethylene; 5.8% by weight of alumina and 54.5% by weight of MWNTs.

Results obtained during the various ethylene polymerization tests starting with crude MWNTs (2.7 bars of ethylene, 50° C., 30 minutes)

TABLE 2

| Sample | Al/Zr (mol/mol) | $m_{crude\ MWNTs}$ (g) | $m_{composites}$ (g) | $m_{PE}$ (g) | Activity (kg/$mol_{Zr} \cdot$ h) | Crude MWNTs obtained by weight (weight %) |
|---|---|---|---|---|---|---|
| 16 | 1000 | 0.25 | 10.21 | 9.96 | 866 | 2.5 |
| 11 | 1000 | 0 | / | 9.90 | 861 | 0 |

TABLE 3

| Sample | Al/Zr (mol/mol) | $m_{crude\ MWNTs}$ (g) | $m_{composites}$ (g) | $m_{PE}$ (g) | Activity (kg/mol$_{Zr}$·h) | Crude MWNTs obtained by weight (weight %) |
|---|---|---|---|---|---|---|
| 21[1] | 450 | 0.25 | 14.37 | 14.12 | 1228 | 2.5 |
| 23[1] | 450 | 0 | / | 9.79 | 851 | / |

N.b.: [1]11.5 μmol Cp*ZrCl$_2$; V$_{heptane}$ total: 100 ml 1 h, 50° C. at 2.7 bars of ethylene (0.25 g of MWNTs)

TABLE 4

| Sampling time[a] | Volume taken (ml) | Weight obtained (g) | m.p. (° C.)[c] | $W_c$ PE (alone)[b,c] (%) | PE content[d] (weight %) |
|---|---|---|---|---|---|
| $t_1$ (Dabo 30 a) | 38 | 0.388 | 130.9 | 45 | 42 |
| $t_2$ (Dabo 30 b) | 40 | 0.637 | 132.1 | 60 | 57.5 |
| $t_3$ (Dabo 30 c) | 39 | 0.769 | 132.8 | 68 | 71.2 |
| $t_4$ (Dabo 30 d) | 50 | 1.419 | 132.9 | 66 | 73.7 |
| $t_5$ (Dabo 30 e) | 39 | 1.577 | 133.1 | 66 | 78.3 |

N.b.: P$_{ethylene}$ = 1.1 bar; T = 50° C.; 1 g of MWNTs/200 ml of n-heptane; 46 μmol Zr/g MWNTs; Al/Zr = 240
[a]Time elapsed between each sample withdrawal: 1 to 2 minutes
[b]Degree of crystallinity calculated for the PE matrix after subtraction of the filler content determined by TGA
[c]Values obtained during the second passage in DSC Values obtained by TGA in helium

TABLE 5

| Mixtures | Breaking stress (MPa) | Breaking strain (MPa) | Young's modulus (MPa) | Yield point stress (MPa) | Yield point strain (%) | MFI (g/10 min) |
|---|---|---|---|---|---|---|
| Dabo 40a | 31 ± 1.6 | 744 ± 41 | 386 ± 44 | 24.4 ± 0.3 | 10 ± 0.5 | 1.01 |
| Dabo 40b | 15.3 ± 1.1 | 98 ± 20 | 419 ± 46 | 25.2 ± 2.2 | 11.2 ± 2.5 | 0.53 |
| Dabo 40c | 21.7 ± 2.4 | 468 ± 55 | 414 ± 30 | 25.5 ± 0.5 | 10 ± 1 | 0.70 |

TABLE 6

| Mixture | m.p. (° C.) | $W_c$ PE alone (%) | $T_{deg.}$ in air (° C.)[a] | $T_{deg.}$ in He (° C.)[a] |
|---|---|---|---|---|
| Dabo 40a | 134.5 | 62.6 | 421 | 493 |
| Dabo 40b | 134.9 | 62.4 | 473 | 498 |
| Dabo 40c | 135.6 | 61.7 | 485 | 498 |

Figure 6:
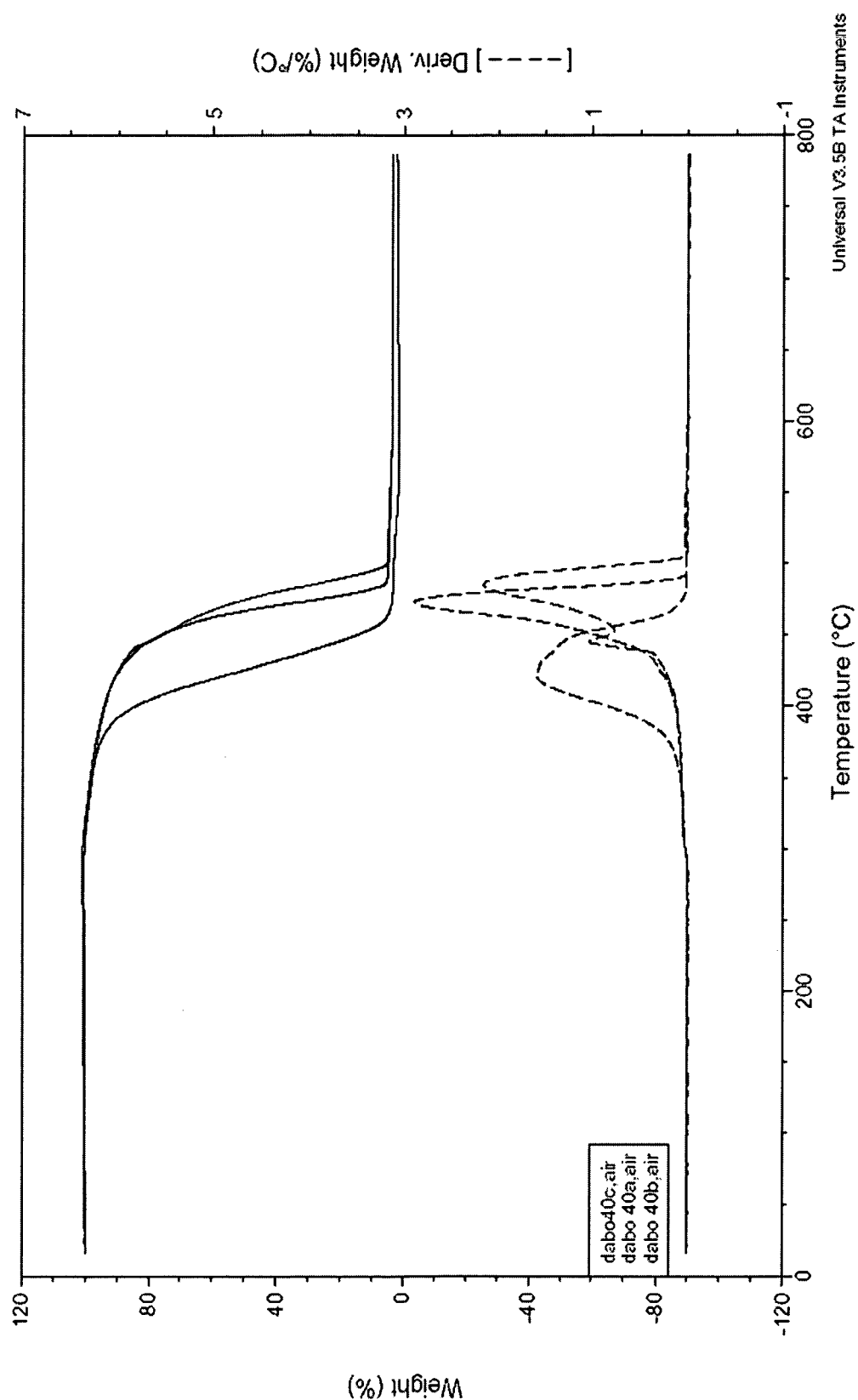
FIG. 6 gives a comparison of the TGA thermograms in air for different mixtures based on HDPE matrix. Sample Dabo40a corresponds to a mixture containing the HDPE matrix alone, the sample Dabo40b corresponds to a simple mixture of an HDPE matrix and of crude MWNT carbon nanotubes (2% by weight), and the sample Dabo40c corresponds to a mixture of an HDPE matrix and of a masterbatch containing crude MWNT carbon nanotubes (2% by weight) as obtain according to the process of the invention.

[a]Determined by the deriv. maximum of the thermogram (see FIG. 6).

TABLE 7

| Sample | SWNTs | Amount of "bound" MAO | [Al]/[Zr] | Mass PE obtained | Activity (kg/mol$_{Zr}$·h) |
|---|---|---|---|---|---|
| Dabo B 013a | No | 9 mmol | 783 | 15.64 g | 1360 |
| Dabo B 012 | Yes | 9 mmol | 783 | 21.28 g | 1850 |

TABLE 8

| Sampling time[a] | Wt % of Al$_2$O$_3$[b] | Wt % of PE[c] | Wt % of H$_2$O[c] | Wt % of SWNTs[d] | m.p. (° C.)[e] | $W_c$ PE (alone)[f] |
|---|---|---|---|---|---|---|
| $t_1$ (Dabo B 015a) | 25.5 | 30.2 | 16.6 | 27.7 | 130.0 | 26 |
| $t_2$ (Dabo B 015b) | 20.6 | 48.4 | 13.7 | 17.3 | 131.5 | 43 |
| $t_3$ (Dabo B 015c) | 15.3 | 63.4 | 10.2 | 11.1 | 133.5 | 51 |
| $t_4$ (Dabo B 015d) | 5.1 | 82.8 | 4.1 | 7.2 | 133.8 | 57 |

[a]Time elapsed between each sample withdrawal is about 1 to 2 minutes;
[b]Determined by TGA in air (20° C./min, taken at 900° C.);
[c]Determined by TGA in helium (20° C./min);
[d]Determined by virtue of knowledge of the amount of PE, alumina and water;
[e]Determined during the second passage in cyclic DSC (10° C./min) on samples dried at 150° C.;
[f]Degree of crystallinity calculated on the basis of the PE obtained by TGA on samples dried at 150° C.

TABLE 9

| Sample | SWNTs | m.p. (° C.)[a] | Wc (%)[b] | Alumina content[c] (weight %) | NT content[d] (weight %) |
|---|---|---|---|---|---|
| Dabo B 013a | No | 132.9 | 71 | n.d. | n.d. |
| Dabo B 012 | Yes | 135.3 | 59 | 1.2 | 2.2 |

[a] Determined during the second passage in cyclic DSC (10° C./min);
[b] Calculated from the heat of fusion during the second passage in cyclic DSC;
[c] Determined by TGA in air (20° C./min);
[d] Determined by TGA in helium (20° C./min) from which is subtracted the reside of the TGA in air.

REFERENCES

[1] A. B. Morgan, J. W. Gilman, T. Kashiwagi, C. L. Jackson; Flammability of polymer-clay nanocomposites (Mar. 12-15 2000), the National Institute of Standards and Technology.
[2] F. Gao; e-Polymers (2002), No. T-004.
[3] P. M. Ajayan; Chem. Rev. (1999) 99, 1787-1799.
[4] B. G. Demczyk, Y. M. Wang, J. Cumings, M. Hetman, W. Han, A. Zettl, R. O. Ritchie; Mater. Sci. Eng. (2002) A334, 173-178.
[5] Kin-Tak Lau, D. Hui; Composites Part B: Eng., (2002) 33, 263-277.
[6] E. T. Thostenson, Z. Ren, Tsu-Wie Chou; Composite Sci. Tech. (2001) 61, 1899-1912.
[7] H. Hagimoto, T. Shiono, T. Ikeda; Macromolecules (2002) 35, 5744-5745.
[8] Dubois P. et al.; J. Macromol. Sci., Rev. Macromol. Chem. Phys. (1998) C38, 511-566.

The invention claimed is:

1. A process for obtaining a composite material comprising at least one polymer matrix obtained by polymerization of a monomer referred to as a "monomer of interest" into a polymer, referred to as a "polymer of interest", in the presence of carbon nanotubes homogeneously dispersed in said polymer matrix, said process comprising:
using said carbon nanotubes as catalysis support to bind homogeneously at the surface thereof a cocatalyst/catalyst couple so as to form a catalytic system, wherein said catalytic system is rendered active for polymerization; and
polymerizing said monomer at the surface of the carbon nanotubes using said active catalytic system, the polymerization being allowed to progress over time so as thus to obtain said polymer matrix around said carbon nanotubes, as the polymerization of said monomer proceeds.

2. The process according to claim 1, further comprising the following steps:
preparing a suspension of carbon nanotubes in an inert solvent;
pretreating said carbon nanotubes by adding said cocatalyst, so as to obtain a suspension of pretreated carbon nanotubes in which the cocatalyst is adsorbed onto the surface of the carbon nanotubes;
preparing a reaction mixture from the suspension of carbon nanotubes thus pretreated, by adding the catalyst and circulating a flow of monomer in said suspension of pretreated nanotubes, so as to bring about in said reaction mixture the polymerization of said monomer at the surface of said nanotubes and thus to form the composite material, in which said carbon nanotubes are coated with said polymer of interest;
stopping the polymerization reaction when the polymerization in the reaction mixture has reached a rate of polymerization of between about 0.1% and about 99.9%.

3. The process according to claim 1, wherein said monomer is an olefin and said polymer of interest is a polyolefin.

4. The process according to claim 1, wherein said monomer of interest is selected from the group consisting of ethylene, propylene, copolymers thereof with alpha-olefins, conjugated alpha-diolefins, styrene, cycloalkenes, norbornene, norbornadiene, cyclopentadiene, and mixtures thereof.

5. The process according to claim 3, wherein said polymer of interest is polyethylene.

6. The process according to claim 1, wherein the cocatalyst/catalyst couple and the experimental parameters are chosen in such a way that the catalyst can be immobilized at the surface of the carbon nanotubes by means of the cocatalyst in order to thus form the catalytic system.

7. The process according to claim 1, wherein the cocatalyst is methylaluminoxane or a chemically modified methylaluminoxane, or a mixture thereof.

8. The process according to claim 1, wherein the cocatalyst/catalyst catalytic couple is the methylaluminoxane/$Cp*_2ZrCl_2$ couple.

9. The process according to claim 1, wherein the amount of catalyst is between about $10^{-6}$ and about $10^{-5}$ mol/g of carbon nanotubes.

10. The process according to claim 1, wherein the amount of cocatalyst in the reaction mixture is between about $10^{-3}$ and about $10^{-2}$ mol/g of carbon nanotubes.

11. The process according to claim 2, wherein the temperature of the reaction mixture is between 25° and 140° C.

12. The process according to claim 2, wherein the pretreatment is performed at a temperature of between 25° C. and 200° C. for a time period of between 1 minute and 2 hours.

13. The process according to claim 1, wherein the polymerization is performed at a pressure of between about 1 and about 3 bars of monomer.

14. The process according to claim 1, wherein the polymerization is performed at a pressure of between about 1.1 and about 2.7 bars of monomer.

15. The process according to claim 2, wherein, in order to prepare the reaction mixture, the catalyst is added to the suspension of pretreated carbon nanotubes before circulating the flow of monomer in said suspension.

16. The process according to claim 2, wherein, in order to prepare the reaction mixture, the addition of the catalyst to the suspension of pretreated carbon nanotubes and the circulation of the flow of monomer in said suspension are concomitant.

17. The process according to claim 1, wherein the carbon nanotubes are selected from the group consisting of single-walled carbon nanotubes, double-walled carbon nanotubes and multi-walled carbon nanotubes, and/or mixtures thereof.

18. The process according to claim 1, wherein the carbon nanotubes are crude and/or purified carbon nanotubes.

19. The process according to claim 1, wherein the carbon nanotubes are functionalized carbon nanotubes.

20. The process according to claim 2, wherein the polymerization reaction is stopped when the rate of polymerization is such that the composite comprises between about 50% and about 9 9.9% of carbon nanotubes and between about 50% and 0.1% of polymer.

21. The process according to claim 2, wherein the polymerization reaction is stopped when the nanocomposite formed comprises between about 0.1% and about 50% of carbon nanotubes homogeneously dispersed at the nanoscopic scale in the polymer matrix, and between about 99.9% and 50% of polymer.

22. The process according to claim 1, further comprising an additional step during which the composite material is used as a masterbatch to prepare a nanocomposite based on a polymer known as an "addition polymer", said addition polymer being miscible and compatible with the polymer of interest of the composite material.

23. A catalytic system for performing the process according to claim 1, consisting of carbon nanotubes, a cocatalyst and a catalyst, said catalyst forming with said cocatalyst a catalytic couple, in which said catalyst and said cocatalyst are bound to the surface of said carbon nanotubes.

24. A composite material obtained by the process according to claim 1.

25. The composite material according to claim 24, comprising between about 0.1% and 99.9% of carbon nanotubes and between about 99.9% and 0.1% of polymer.

26. The composite material obtained by the process according to claim 1 and corresponding to a nanocomposite comprising at least one matrix of at least one polymer, in which carbon nanotubes are homogeneously dispersed at the nanoscopic scale.

27. The composite material according to claim 26, comprising between about 0.1% and about 50% of carbon nanotubes and between about 99.9% and about 50% of polymer.

28. The composite material according to claim 24, wherein the carbon nanotubes are coated with polymer.

29. A composite material comprising a matrix of at least one addition polymer and the composite material according to claim 24.

30. A process for polymerizing a monomer comprising using the process according to claim 1, the polymerization reaction being allowed to proceed for a period sufficiently long so as to have a content of carbon nanotubes of less than 0.1% and a polymer content of greater than 99.9%.

31. A catalytic system for performing the process according to claim 22, consisting of carbon nanotubes, a cocatalyst and a catalyst, said catalyst forming with said cocatalyst a catalytic couple, in which said catalyst and said cocatalyst are bound to the surface of said carbon nanotubes.

32. A composite material obtained by the process according to claim 22.

33. The composite material according to claim 32, comprising between about 0.1% and 99.9% of carbon nanotubes and between about 99.9% and 0.1% of polymer.

34. The composite material obtained by the process according to claim 22 and corresponding to a nanocomposite comprising at least one matrix of at least one polymer, in which carbon nanotubes are homogeneously dispersed at the nanoscopic scale.

35. The composite material according to claim 34, comprising between about 0.1% and about 50% of carbon nanotubes and between about 99.9% and about 50% of polymer.

36. The composite material according to claim 32, wherein the carbon nanotubes are coated with polymer.

37. A composite material comprising a matrix of at least one addition polymer and the composite material according to claim 32.

38. A process for polymerizing a monomer, comprising using the process according to claim 22, the polymerization reaction being allowed to proceed for a period sufficiently long so as to have a content of carbon nanotubes of less than 0.1% and a polymer content of greater than 99.9%.

* * * * *